United States Patent
Luo et al.

(10) Patent No.: US 10,362,549 B2
(45) Date of Patent: Jul. 23, 2019

(54) METHOD AND APPARATUS FOR SETTING UP INTERFACE BETWEEN ACCESS POINTS

(71) Applicant: Huawei Technologies Co., Ltd., Shenzhen (CN)

(72) Inventors: Jun Luo, Shanghai (CN); Jiayin Zhang, Shanghai (CN); Yingpei Lin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 344 days.

(21) Appl. No.: 15/069,051

(22) Filed: Mar. 14, 2016

(65) Prior Publication Data
US 2016/0198424 A1 Jul. 7, 2016

Related U.S. Application Data

(63) Continuation of application No. PCT/CN2013/083793, filed on Sep. 18, 2013.

(51) Int. Cl.
*H04W 56/00* (2009.01)
*H04L 12/741* (2013.01)
(Continued)

(52) U.S. Cl.
CPC ......... *H04W 56/002* (2013.01); *H04L 45/745* (2013.01); *H04W 24/10* (2013.01);
(Continued)

(58) Field of Classification Search
CPC .............. H04W 56/002; H04W 24/10; H04W 72/0426; H04W 72/082; H04W 76/12;
(Continued)

(56) References Cited

U.S. PATENT DOCUMENTS 7,499,460 B2 * 3/2009 Csapo ................ H04W 16/00
370/335
8,532,694 B2 * 9/2013 Gupta ................ H04L 63/102
455/443
(Continued)

FOREIGN PATENT DOCUMENTS

CN 101730054 A 6/2010
CN 101790152 A 7/2010
(Continued)

*Primary Examiner* — Andrew Lai
*Assistant Examiner* — Andrew C Lee
(74) *Attorney, Agent, or Firm* — Slater Matsil, LLP

(57) ABSTRACT

Embodiments of the present invention provide a method and an apparatus for setting up an interface between access points, where a first AP receives measurement information reported by at least one station associated with the first AP, to learn an AP identifier of a second AP having a capability of supporting an AP2AP interface, determines an AP identifier of a candidate AP according to interface information in the measurement information, and sends, to the candidate AP by using an AC, a first request message requesting an IP address used for setting up a communications interface between APs, the candidate AP sends, by using the AC, a response message to the first AP according to the first request message, and the first AP determines, according to the response message, whether to set up an AP2AP communications interface with the candidate AP that sends the response message.

20 Claims, 8 Drawing Sheets

(51) Int. Cl.
*H04W 24/10* (2009.01)
*H04W 72/04* (2009.01)
*H04W 72/08* (2009.01)
*H04W 72/12* (2009.01)
*H04W 76/12* (2018.01)
*H04W 92/20* (2009.01)
*H04W 84/12* (2009.01)
*H04W 88/08* (2009.01)
*H04W 88/12* (2009.01)

(52) U.S. Cl.
CPC ..... *H04W 72/0426* (2013.01); *H04W 72/082* (2013.01); *H04W 72/1231* (2013.01); *H04W 76/12* (2018.02); *H04W 84/12* (2013.01); *H04W 88/08* (2013.01); *H04W 88/12* (2013.01); *H04W 92/20* (2013.01)

(58) Field of Classification Search
CPC ..... H04W 84/12; H04W 88/08; H04W 88/12; H04W 92/20; H04W 48/12; H04W 36/04; H04W 48/16; H04W 84/045; H04W 92/12; H04L 45/745
See application file for complete search history.

(56) References Cited

U.S. PATENT DOCUMENTS

| | | | |
|---|---|---|---|
| 9,241,354 B2* | 1/2016 | Xu | H04W 76/10 |
| 9,294,972 B2* | 3/2016 | Radulescu | H04W 36/0083 |
| 2003/0202497 A1 | 10/2003 | Csapo | |
| 2004/0053609 A1* | 3/2004 | Karaoguz | H04L 12/14 |
| | | | 455/424 |
| 2004/0246940 A1* | 12/2004 | Kubler | G06F 1/1626 |
| | | | 370/351 |
| 2006/0018336 A1* | 1/2006 | Sutivong | H04L 1/1692 |
| | | | 370/437 |
| 2006/0133269 A1* | 6/2006 | Prakash | H04W 68/00 |
| | | | 370/229 |
| 2006/0133273 A1* | 6/2006 | Julian | H04L 1/1671 |
| | | | 370/230 |
| 2007/0019670 A1* | 1/2007 | Falardeau | H04W 48/18 |
| | | | 370/465 |
| 2007/0254620 A1* | 11/2007 | Lindqvist | H04W 48/12 |
| | | | 455/403 |
| 2010/0169412 A1* | 7/2010 | Gupta | H04L 63/102 |
| | | | 709/203 |
| 2010/0173667 A1* | 7/2010 | Hui | H04W 88/06 |
| | | | 455/552.1 |
| 2010/0189047 A1* | 7/2010 | Baum | H04B 7/024 |
| | | | 370/329 |
| 2010/0195632 A1* | 8/2010 | Prabhu | H04W 36/32 |
| | | | 370/338 |
| 2010/0238871 A1* | 9/2010 | Tosic | H04W 16/10 |
| | | | 370/329 |
| 2010/0265864 A1* | 10/2010 | He | H04W 68/025 |
| | | | 370/311 |
| 2010/0330918 A1* | 12/2010 | Taghavi Nasrabadi | H04W 72/08 |
| | | | 455/63.3 |
| 2011/0065431 A1* | 3/2011 | Neil | H04W 48/16 |
| | | | 455/434 |
| 2011/0070918 A1* | 3/2011 | Hafeez | H04B 7/024 |
| | | | 455/522 |
| 2011/0093913 A1* | 4/2011 | Wohlert | H04L 63/101 |
| | | | 726/1 |
| 2011/0263264 A1* | 10/2011 | Fan | H04W 92/20 |
| | | | 455/449 |
| 2012/0100884 A1* | 4/2012 | Radulescu | H04W 36/0083 |
| | | | 455/524 |
| 2012/0113918 A1* | 5/2012 | Freda | H04W 72/1205 |
| | | | 370/329 |
| 2012/0170505 A1* | 7/2012 | Xiao | H04B 7/15 |
| | | | 370/315 |
| 2014/0223479 A1* | 8/2014 | Krishnamoorthi | H04L 12/189 |
| | | | 725/39 |
| 2016/0119812 A1* | 4/2016 | Owan | H04W 28/0236 |
| | | | 370/230 |

FOREIGN PATENT DOCUMENTS

| | | | |
|---|---|---|---|
| CN | 102273169 A | 12/2011 | |
| CN | 102378360 A | 3/2012 | |
| CN | 102860067 A | 1/2013 | |
| WO | 2007089109 A1 | 8/2007 | |
| WO | WO-2007089109 A1 * | 8/2007 | ......... H04W 36/005 |

* cited by examiner

METHOD AND APPARATUS FOR SETTING UP INTERFACE BETWEEN ACCESS POINTS

This application is a continuation of International Patent Application No. PCT/CN2013/083793, filed on Sep. 18, 2013, which is hereby incorporated by reference in its entirety.

TECHNICAL FIELD

Embodiments of the present invention relate to communications technologies, and in particular, to a method and an apparatus for setting up an interface between access points.

BACKGROUND

With rise of the mobile Internet and popularization of intelligent terminals, data traffic presents explosive increase. Due to advantages in aspects of data transmission rate and costs, a wireless local area network (WLAN) system becomes one of currently globally widely applied broadband wireless access technologies.

To improve the throughput of the WLAN system, the system needs to support key technologies of types such as coordinated transmission, interference management, resource scheduling, and service continuity guarantee of an access point (AP), but these types of technologies all require that a large quantity of real-time information exchange is performed between APs. Moreover, in the conventional WLAN system, one access controller (AC) controls multiple APs, each AP manages multiple stations, and information is forwarded between APs by using the AC. However, forwarding information by using the AC has a delay problem. Moreover, when one AC manages multiple APs, an amount of information processed by the AC is inevitably very large, which imposes a very high requirement on a processing capability of the AC, and therefore, information exchange between APs cannot be implemented by using a method in the prior art.

SUMMARY

The present invention provides a method and an apparatus for setting up an interface between access points, so as to implement information exchange between the APs.

According to a first aspect of embodiments of the present invention, a method for setting up a communications interface between access points is provided, including:

receiving, by a first AP, measurement information reported by at least one station, where the measurement information includes interface information of at least one second AP, and the interface information of the second AP includes an AP identifier of the second AP and a capability of supporting a communications interface between APs;

determining, by the first AP, M candidate APs according to the interface information in the measurement information, where M is an integer greater than or equal to 1;

sending, by the first AP, a first request message to each of the M candidate APs by using an access controller AC, where the first request message is used for requesting the candidate AP for an Internet Protocol (IP) address used for setting up a communications interface between APs; and receiving, by the first AP by using the AC, a response message that is determined by the candidate AP according to the first request message, and determining, according to the response message, whether to set up a communications interface with the candidate AP that sends the response message.

With reference to the first aspect, in a first possible implementation manner, the interface information further includes interface type information; and the determining, by the first AP, M candidate APs according to the interface information in the measurement information includes:

if the interface type information in the measurement information includes a target interface type, determining, by the first AP, that M second APs corresponding to the measurement information are the M candidate APs, where the target interface type is a type of an interface that the first AP requests to set up.

With reference to the first aspect, in a second possible implementation manner, the interface information further includes interface type information and duration corresponding to an interface type in the interface type information; and the determining, by the first AP, M candidate APs according to the interface information in the measurement information includes:

if the interface type information in the measurement information includes a target interface type, and duration corresponding to the target interface type included in the interface type information is greater than target duration, determining, by the first AP, that M second APs corresponding to the measurement information are the M candidate APs, where the target interface type is a type of an interface that the first AP requests to set up, and the target duration is duration of the type of the interface that the first AP requests to set up.

With reference to the first aspect or the first possible implementation manner or the second possible implementation manner, in a third possible implementation manner, the first request message includes a target interface type, where the target interface type is a type of an interface that the first AP requests to set up; and the receiving, by the first AP by using the AC, a response message that is determined by the candidate AP according to the first request message includes:

receiving, by the first AP by using the AC, the response message that is determined by the candidate AP according to the target interface type in the first request message.

With reference to the first aspect or the first possible implementation manner or the second possible implementation manner, in a fourth possible implementation manner, the first request message includes a target interface type and target duration, the target interface type is a type of an interface that the first AP requests to set up, and the target duration is duration of the type of the interface that the first AP requests to set up; and the receiving, by the first AP by using the AC, a response message that is determined by the candidate AP according to the first request message includes:

receiving, by the first AP by using the AC, the response message that is determined by the candidate AP according to the target interface type and the target duration in the first request message.

With reference to the third possible implementation manner, in a fifth possible implementation manner, the sending, by the first AP, a first request message to each of the M candidate APs by using an access controller AC includes:

sending, by the first AP for each candidate AP, a second request message to the AC, where each second request message includes an AP identifier of one of the candidate APs and the target interface type, so that the AC sends, according to the identifier, included in the second request message, of the candidate AP, the first request message to the candidate AP corresponding to the AP identifier of the candidate AP.

With reference to the third possible implementation manner, in a sixth possible implementation manner, the sending, by the first AP, a first request message to each of the M candidate APs by using an access controller AC includes:

sending, by the first AP, N second request messages to the AC, where each second request message includes AP identifiers of at least two of the candidate APs and the target interface type, so that the AC sends, according to the AP identifiers, included in the second request message, of the at least two of the candidate APs, the first request message to each of the candidate APs corresponding to the AP identifiers of the at least two of the candidate APs, where 1≤N≤M, and a total quantity of the AP identifiers, included in the N second request messages, of the candidate APs is M.

With reference to the first aspect or any possible implementation manner of the first to sixth possible implementation manners, in a seventh possible implementation manner, before the receiving, by a first AP, measurement information reported by at least one station, the method further includes:

setting up, by the first AP, an interface information database; and after the receiving, by a first AP, measurement information reported by at least one station, the method further includes:

saving, by the first AP, the interface information in the measurement information correspondingly in the interface information database.

With reference to the first aspect or any possible implementation manner of the first to seventh possible implementation manners of the first aspect, in an eighth possible implementation manner, before the receiving, by a first AP, measurement information reported by at least one station, the method further includes:

sending, by the first AP, a measurement request to the at least one station, so that the at least one station acquires the measurement information according to the measurement request.

With reference to any possible implementation manner of the first to eighth possible implementation manners, in a ninth possible implementation manner, if there are at least two stations, the receiving, by a first AP, measurement information reported by at least one station includes:

receiving, by the first AP, measurement information reported by the at least two stations; and acquiring, by the first AP, a union set of the measurement information reported by the at least two stations.

With reference to any possible implementation manner of the first to ninth possible implementation manners, in a tenth possible implementation manner, the interface type information includes at least one of the following interface types:

coordinated transmission, interference management, resource scheduling, and service continuity.

With reference to any possible implementation manner of the first to tenth possible implementation manners, in an eleventh possible implementation manner, the target interface type includes at least one of the following interface types:

coordinated transmission, interference management, resource scheduling, and service continuity.

With reference to the first aspect or any possible implementation manner of the first to eleventh possible implementation manners of the first aspect, in a twelfth possible implementation manner, the response message is a setup accept message or a setup reject message; and the setup accept message includes the IP address of the candidate AP; and the determining, by the first AP, according to the response message, whether to set up a communications interface with the candidate AP that sends the response message includes:

if the response message is the setup accept message, setting up, by the first AP, a communications interface with the candidate AP according to the IP address, included in the setup accept message, of the candidate AP; or if the response message is the setup reject message, skipping, by the first AP, setting up a communications interface with the candidate AP.

With reference to the twelfth possible implementation manner, in a thirteenth possible implementation manner, the setting up, by the first AP, a communications interface with the candidate AP according to the IP address, included in the setup accept message, of the candidate AP includes:

sending, by the first AP, a setup request message of a communications interface between access points to the candidate AP according to the IP address of the candidate AP, so that the candidate AP sets up the communications interface between access points according to the setup request message of the communications interface.

With reference to the twelfth possible implementation manner, in a fourteenth possible implementation manner, after the setting up, by the first AP, a communications interface with the candidate AP according to the IP address, included in the setup accept message, of the candidate AP, the method further includes:

sending, by the first AP, an update request or a reset request of a communications interface between access points to the candidate AP according to the IP address of the candidate AP, so that the candidate AP updates or resets the communications interface between access points according to the update request or the reset request.

According to a second aspect of the embodiments of the present invention, a method for setting up a communications interface between access points is provided, including:

acquiring, by a station, measurement information, where the measurement information includes interface information of at least one second AP, and the interface information includes an AP identifier of the second AP and a capability of supporting a communications interface between APs; and reporting, by the station, the measurement information to a first AP, so that the first AP determines M candidate APs according to the interface information in the measurement information.

With reference to the second aspect, in a first possible implementation manner, the interface information further includes interface type information; and the reporting, by the station, the measurement information to a first AP, so that the first AP determines M candidate APs according to the interface information in the measurement information includes:

reporting, by the station, the measurement information to the first AP, so that the first AP determines the M candidate APs according to the interface type information in the interface information in the measurement information.

With reference to the second aspect or the first possible implementation manner, in a second possible implementation manner, the interface information further includes duration corresponding to an interface type in the interface type information; and the reporting, by the station, the measurement information to a first AP, so that the first AP determines M candidate APs according to the interface information in the measurement information includes:

reporting, by the station, the measurement information to the first AP, so that the first AP determines the M candidate APs according to the interface type information in the measurement information and the duration corresponding to the interface type in the interface type information.

With reference to the second aspect or the first possible implementation manner or the second possible implementation manner, in a third possible implementation manner, the second AP includes an AP in an extended service set system and a coexistence system and a previously associated AP of a non-overlapping basic service set.

With reference to the second aspect or any possible implementation manner of the first possible implementation manner to the third possible implementation manner, in a fourth possible implementation manner, before the acquiring, by a station, measurement information, the method further includes:

sending, by the station, an interface information request message to the at least one second AP, so that the at least one second AP sends an interface information response message according to the interface information request message, and the interface information response message includes the interface information.

With reference to the fourth possible implementation manner, in a fifth possible implementation manner, the interface information request message is carried in a probe request frame; and the interface information response message is carried in a probe response Probe Response frame.

With reference to the second aspect or any possible implementation manner of the first possible implementation manner to the third possible implementation manner, in a sixth possible implementation manner, before the acquiring measurement information, the method further includes:

periodically receiving, by the station, a beacon frame sent by the at least one second AP, where the Beacon frame carries the interface information of the second AP; and the acquiring, by a station, measurement information includes:

acquiring, by the station, the interface information of the at least one second AP from the Beacon frame sent by the at least one second AP.

According to a third aspect of the embodiments of the present invention, a method for setting up a communications interface between access points is provided, including:

receiving, by an AC, a second request message sent by a first AP, where the second request message includes an AP identifier of at least one candidate AP;

sending, by the AC, according to the second request message, a first request message to a candidate AP corresponding to the AP identifier, included in the second request message, of the at least one candidate AP, where the first request message is used for requesting the candidate AP for an IP address used for setting up a communications interface between APs; and sending, by the AC, a response message that is determined by the candidate AP according to the first request message to the first AP, so that the first AP determines, according to the response message, whether to set up a communications interface with the candidate AP that sends the response message.

With reference to the third aspect, in a first possible implementation manner, the second request message further includes a target interface type;

the first request message includes the target interface type, and the first request message is used for requesting the candidate AP for an IP address used for setting up a communications interface between APs of the target interface type; and the sending, by the AC, a response message that is determined by the candidate AP according to the first request message to the first AP includes:

sending, by the AC to the first AP, the response message that is determined by the candidate AP according to the target interface type.

With reference to the first possible implementation manner, in a second possible implementation manner, if the second request message includes an AP identifier of a candidate AP and the target interface type, the sending, by the AC, according to the second request message, a first request message to a candidate AP corresponding to the AP identifier, included in the second request message, of the at least one candidate AP includes:

sending, by the AC, according to the identifier, included in the second request message, of the candidate AP, the first request message to the candidate AP corresponding to the AP identifier of the candidate AP.

With reference to the first possible implementation manner, in a third possible implementation manner, if the second request message includes AP identifiers of at least two candidate APs and the target interface type, the sending, by the AC, according to the second request message, a first request message to a candidate AP corresponding to the AP identifier, included in the second request message, of the at least one candidate AP includes:

generating, by the AC, at least two first request messages according to the second request message; and sending, by the AC, the first request messages respectively to candidate APs corresponding to the AP identifiers of the at least two candidate APs.

According to a fourth aspect of the embodiments of the present invention, a method for setting up a communications interface between access points is provided, including:

receiving, by a candidate AP, a first request message sent by an access controller AC, where the first request message is used for requesting the candidate AP for an Internet Protocol IP address used for setting up a communications interface between APs;

determining, by the candidate AP according to the first request message, a response message to be sent to the AC; and sending, by the candidate AP, the response message to the AC, so that the AC forwards, to a first AP, the response message sent by the candidate AP, and the first AP determines, according to the response message, whether to set up a communications interface with the candidate AP that sends the response message.

With reference to the fourth aspect, in a first possible implementation manner, the first request message includes a target interface type, where the target interface type is a type of an interface that the first AP requests to set up; and the determining, by the candidate AP according to the first request message, a response message to be sent to the AC includes:

determining, by the candidate AP according to the target interface type, the response message to be sent to the AC.

With reference to the first possible implementation manner, in a second possible implementation manner, the first request message further includes target duration, where the target duration is duration of the type of the interface that the first AP requests to set up; and the determining, by the candidate AP according to the first request message, a response message to be sent to the AC includes:

determining, by the candidate AP according to the target interface type and the target duration, the response message to be sent to the AC.

According to a fifth aspect of the embodiments of the present invention, an apparatus for setting up a communications interface between access points is provided, including:

a first receiving module, configured to receive measurement information reported by at least one station, where the measurement information includes interface information of at least one second AP, and the interface information of the second AP includes an AP identifier of the second AP and a capability of supporting a communications interface between APs;

a first processing module, configured to determine M candidate APs according to the interface information in the measurement information, where M is an integer greater than or equal to 1;

a sending module, configured to send a first request message to each of the M candidate APs by using an access controller AC, where the first request message is used for requesting the candidate AP for an Internet Protocol IP address used for setting up a communications interface between APs;

a second receiving module, configured to receive, by using the AC, a response message that is determined by the candidate AP according to the first request message; and a second processing module, configured to determine, according to the response message, whether to set up a communications interface with the candidate AP that sends the response message.

With reference to the fifth aspect, in a first possible implementation manner, the interface information further includes interface type information; and the first processing module is specifically configured to: if the interface type information in the measurement information includes a target interface type, determine that M second APs corresponding to the measurement information are the M candidate APs, where the target interface type is a type of an interface that the first AP requests to set up.

With reference to the fifth aspect, in a second possible implementation manner, the interface information further includes interface type information and duration corresponding to an interface type in the interface type information; and the first processing module is specifically configured to: if the interface type information in the measurement information includes a target interface type, and duration corresponding to the target interface type included in the interface type information is greater than target duration, determine that M second APs corresponding to the measurement information are the M candidate APs, where the target interface type is a type of an interface that the first AP requests to set up, and the target duration is duration of the type of the interface that the first AP requests to set up.

With reference to the fifth aspect or the first possible implementation manner or the second possible implementation manner, in a third possible implementation manner, the first request message includes a target interface type, where the target interface type is a type of an interface that the first AP requests to set up; and the sending module is specifically configured to receive, by using the AC, the response message that is determined by the candidate AP according to the target interface type in the first request message.

With reference to the fifth aspect or the first possible implementation manner or the second possible implementation manner, in a fourth possible implementation manner, the first request message includes a target interface type and target duration, the target interface type is a type of an interface that the first AP requests to set up, and the target duration is duration of the type of the interface that the first AP requests to set up; and the second receiving module is specifically configured to receive, by using the AC, the response message that is determined by the candidate AP according to the target interface type and the target duration in the first request message.

With reference to the third possible implementation manner, in a fifth possible implementation manner, the sending module is specifically configured to send, for each candidate AP, a second request message to the AC, where each second request message includes an AP identifier of one of the candidate APs and the target interface type, so that the AC sends, according to the identifier, included in the second request message, of the candidate AP, the first request message to the candidate AP corresponding to the AP identifier of the candidate AP.

With reference to the third possible implementation manner, in a sixth possible implementation manner, the sending module is specifically configured to send N second request messages to the AC, where each second request message includes AP identifiers of at least two of the candidate APs and the target interface type, so that the AC sends, according to the AP identifiers, included in the second request message, of the at least two of the candidate APs, the first request message to each of the candidate APs corresponding to the AP identifiers of the at least two of the candidate APs, where 1≤N≤M, and a total quantity of the AP identifiers, included in the N second request messages, of the candidate APs is M.

With reference to any possible implementation manner of the first to sixth possible implementation manners, in a seventh possible implementation manner, the first processing module is further configured to: before the first receiving module receives the measurement information reported by the at least one station, set up an interface information database; and the first processing module is further configured to: after the first receiving module receives the measurement information reported by the at least one station, save the interface information in the measurement information correspondingly in the interface information database.

With reference to the fifth aspect or any possible implementation manner of the first to seventh possible implementation manners of the fifth aspect, in an eighth possible implementation manner, the sending module is further configured to: before the first receiving module receives the measurement information reported by the at least one station, send a measurement request to the at least one station, so that the at least one station acquires the measurement information according to the measurement request.

With reference to any possible implementation manner of the first to eighth possible implementation manners, in a ninth possible implementation manner, if there are at least two stations, the first receiving module is specifically configured to receive measurement information reported by the at least two stations; and acquire a union set of the measurement information reported by the at least two stations.

With reference to any possible implementation manner of the first to ninth possible implementation manners, in a tenth possible implementation manner, the interface type information includes at least one of the following interface types:

coordinated transmission, interference management, resource scheduling, and service continuity.

With reference to any possible implementation manner of the first to tenth possible implementation manners, in an eleventh possible implementation manner, the target interface type includes at least one of the following interface types:

coordinated transmission, interference management, resource scheduling, and service continuity.

With reference to the fifth aspect or any possible implementation manner of the first to eleventh possible implementation manners of the fifth aspect, in a twelfth possible implementation manner, the response message is a setup accept message or a setup reject message; and the setup accept message includes the IP address of the candidate AP; and the second processing module is specifically configured to: if the response message is the setup accept message, set up a communications interface with the candidate AP according to the IP address, included in the setup accept message, of the candidate AP; or if the response message is the setup reject message, skip setting up a communications interface with the candidate AP.

With reference to the twelfth possible implementation manner, in a thirteenth possible implementation manner, the second processing module is specifically configured to send a setup request message of a communications interface between access points to the candidate AP according to the IP address of the candidate AP, so that the candidate AP sets up the communications interface between access points according to the setup request message of the communications interface.

With reference to the twelfth possible implementation manner, in a fourteenth possible implementation manner, the sending module is further configured to: after the second processing module sets up the communications interface with the candidate AP according to the IP address, included in the setup accept message, of the candidate AP, send an update request or a reset request of a communications interface between access points to the candidate AP according to the IP address of the candidate AP, so that the candidate AP updates or resets the communications interface between access points according to the update request or the reset request.

According to a sixth aspect of the embodiments of the present invention, an apparatus for setting up a communications interface between access points is provided, including:

an acquiring module, configured to acquire measurement information, where the measurement information includes interface information of at least one second AP, and the interface information includes an AP identifier of the second AP and a capability of supporting a communications interface between APs; and a sending module, configured to report the measurement information to a first AP, so that the first AP determines M candidate APs according to the interface information in the measurement information.

With reference to the sixth aspect, in a first possible implementation manner, the interface information further includes interface type information; and the sending module is specifically configured to report the measurement information to the first AP, so that the first AP determines the M candidate APs according to the interface type information in the interface information in the measurement information.

With reference to the sixth aspect or the first possible implementation manner, in a second possible implementation manner, the interface information further includes duration corresponding to an interface type in the interface type information; and the sending module is specifically configured to report the measurement information to the first AP, so that the first AP determines the M candidate APs according to the interface type information in the measurement information and the duration corresponding to the interface type in the interface type information.

With reference to the sixth aspect or the first possible implementation manner or the second possible implementation manner, in a third possible implementation manner, the second AP includes an AP in an extended service set system and a coexistence system and a previously associated AP of a non-overlapping basic service set.

With reference to the sixth aspect or any possible implementation manner of the first to third possible implementation manners, in a fourth possible implementation manner, the sending module is further configured to: before the acquiring module acquires the measurement information, send an interface information request message to the at least one second AP, so that the at least one second AP sends an interface information response message according to the interface information request message, and the interface information response message includes the interface information.

With reference to the fourth possible implementation manner, in a fifth possible implementation manner, the interface information request message is carried in a probe request frame; and the interface information response message is carried in a probe response Probe Response frame.

With reference to the sixth aspect or any possible implementation manner of the first possible implementation manner to the third possible implementation manner, in a sixth possible implementation manner, the acquiring module is further configured to: before acquiring the measurement information, periodically receive a beacon frame sent by the at least one second AP, where the Beacon frame carries the interface information of the second AP; and the acquiring module is specifically configured to acquire the interface information of the at least one second AP from the Beacon frame sent by the at least one second AP.

According to a seventh aspect of the embodiments of the present invention, an apparatus for setting up a communications interface between access points is provided, including:

a receiving module, configured to receive a second request message sent by a first AP, where the second request message includes an AP identifier of at least one candidate AP;

a processing module, configured to send, according to the second request message, a first request message to a candidate AP corresponding to the AP identifier, included in the second request message, of the at least one candidate AP, where the first request message is used for requesting the candidate AP for an IP address used for setting up a communications interface between APs; and a sending module, configured to send a response message that is determined by the candidate AP according to the first request message to the first AP, so that the first AP determines, according to the response message, whether to set up a communications interface with the candidate AP that sends the response message.

With reference to the seventh aspect, in a first possible implementation manner, the second request message further includes a target interface type;

the first request message includes the target interface type, and the first request message is used for requesting the candidate AP for an IP address used for setting up a communications interface between APs of the target interface type; and the sending module is specifically configured to send to the first AP the response message that is determined by the candidate AP according to the target interface type.

With reference to the first possible implementation manner, in a second possible implementation manner, if the second request message includes an AP identifier of a candidate AP and the target interface type, the processing module is specifically configured to send, according to the identifier, included in the second request message, of the candidate AP, the first request message to the candidate AP corresponding to the AP identifier of the candidate AP.

With reference to the first possible implementation manner, in a third possible implementation manner, if the second request message includes AP identifiers of at least two candidate APs and the target interface type, the processing module is specifically configured to generate at least two first request messages according to the second request message; and send the first request messages respectively to candidate APs corresponding to the AP identifiers of the at least two candidate APs.

According to an eighth aspect of the embodiments of the present invention, an apparatus for setting up a communications interface between access points is provided, including:

a receiving module, configured to receive a first request message sent by an access controller AC, where the first request message is used for requesting the candidate AP for an Internet Protocol IP address used for setting up a communications interface between APs;

a processing module, configured to determine, according to the first request message, a response message to be sent to the AC; and a sending module, configured to send the response message to the AC, so that the AC forwards, to a first AP, the response message sent by the candidate AP, and the first AP determines, according to the response message, whether to set up a communications interface with the candidate AP that sends the response message.

With reference to the eighth aspect, in a first possible implementation manner, the first request message includes a target interface type, where the target interface type is a type of an interface that the first AP requests to set up; and the processing module is specifically configured to determine, according to the target interface type, the response message to be sent to the AC.

With reference to the first possible implementation manner, in a second possible implementation manner, the first request message further includes target duration, where the target duration is duration of the type of the interface that the first AP requests to set up; and the processing module is specifically configured to determine, according to the target interface type and the target duration, the response message to be sent to the AC.

According to a ninth aspect of the embodiments of the present invention, an apparatus for setting up a communications interface between access points is provided, including:

a receiver, configured to receive measurement information reported by at least one station, where the measurement information includes interface information of at least one second AP, and the interface information of the second AP includes an AP identifier of the second AP and a capability of supporting a communications interface between APs; and receive, by using an access controller AC, a response message that is determined by the candidate AP according to the first request message;

a processor, configured to determine M candidate APs according to the interface information in the measurement information, where M is an integer greater than or equal to 1;

and determine, according to the response message, whether to set up a communications interface with the candidate AP that sends the response message; and a transmitter, configured to send a first request message to each of the M candidate APs by using the AC, where the first request message is used for requesting the candidate AP for an Internet Protocol IP address used for setting up a communications interface between APs.

With reference to the ninth aspect, in a first possible implementation manner, the interface information further includes interface type information; and the processor is specifically configured to: if the interface type information in the measurement information includes a target interface type, determine that M second APs corresponding to the measurement information are the M candidate APs, where the target interface type is a type of an interface that the first AP requests to set up.

With reference to the ninth aspect, in a second possible implementation manner, the interface information further includes interface type information and duration corresponding to an interface type in the interface type information; and the processor is specifically configured to: if the interface type information in the measurement information includes a target interface type, and duration corresponding to the target interface type included in the interface type information is greater than target duration, determine that M second APs corresponding to the measurement information are the M candidate APs, where the target interface type is a type of an interface that the first AP requests to set up, and the target duration is duration of the type of the interface that the first AP requests to set up.

With reference to the ninth aspect or the first possible implementation manner or the second possible implementation manner, in a third possible implementation manner, the first request message includes a target interface type, where the target interface type is a type of an interface that the first AP requests to set up; and the transmitter is specifically configured to receive, by using the AC, the response message that is determined by the candidate AP according to the target interface type in the first request message.

With reference to the ninth aspect or the first possible implementation manner or the second possible implementation manner, in a fourth possible implementation manner, the first request message includes a target interface type and target duration, the target interface type is a type of an interface that the first AP requests to set up, and the target duration is duration of the type of the interface that the first AP requests to set up; and the receiver is configured to receive, by using the AC, the response message that is determined by the candidate AP according to the target interface type and the target duration in the first request message.

With reference to the third possible implementation manner, in a fifth possible implementation manner, the transmitter is specifically configured to send, for each candidate AP, a second request message to the AC, where each second request message includes an AP identifier of one of the candidate APs and the target interface type, so that the AC sends, according to the identifier, included in the second request message, of the candidate AP, the first request message to the candidate AP corresponding to the AP identifier of the candidate AP.

With reference to the third possible implementation manner, in a sixth possible implementation manner, the transmitter is specifically configured to send N second request messages to the AC, where each second request message includes AP identifiers of at least two of the candidate APs and the target interface type, so that the AC sends, according to the AP identifiers, included in the second request message, of the at least two of the candidate APs, the first request message to each of the candidate APs corresponding to the AP identifiers of the at least two of the candidate APs, where $1 \leq N \leq M$, and a total quantity of the AP identifiers, included in the N second request messages, of the candidate APs is M.

With reference to any possible implementation manner of the first to sixth possible implementation manners, in a seventh possible implementation manner, the processor is further configured to: before the receiver receives the measurement information reported by the at least one station, set up an interface information database; and the processor is further configured to: after the receiver receives the measurement information reported by the at least one station, save the interface information in the measurement information correspondingly in the interface information database.

With reference to the ninth aspect or any possible implementation manner of the first to seventh possible implementation manners of the ninth aspect, in an eighth possible implementation manner, the transmitter is further configured to: before the receiver receives the measurement information reported by the at least one station, send a measurement request to the at least one station, so that the at least one station acquires the measurement information according to the measurement request.

With reference to any possible implementation manner of the first to eighth possible implementation manners, in a ninth possible implementation manner, if there are at least two stations, the receiver is specifically configured to receive measurement information reported by the at least two stations; and acquire a union set of the measurement information reported by the at least two stations.

With reference to any possible implementation manner of the first to ninth possible implementation manners, in a tenth possible implementation manner, the interface type information includes at least one of the following interface types:

coordinated transmission, interference management, resource scheduling, and service continuity.

With reference to any possible implementation manner of the first to tenth possible implementation manners, in an eleventh possible implementation manner, the target interface type includes at least one of the following interface types:

coordinated transmission, interference management, resource scheduling, and service continuity.

With reference to the ninth aspect or any possible implementation manner of the first to eleventh possible implementation manners of the ninth aspect, in a twelfth possible implementation manner, the response message is a setup accept message or a setup reject message; and the setup accept message includes the IP address of the candidate AP; and the processor is specifically configured to: if the response message is the setup accept message, set up a communications interface with the candidate AP according to the IP address, included in the setup accept message, of the candidate AP; or if the response message is the setup reject message, skip setting up a communications interface with the candidate AP.

With reference to the twelfth possible implementation manner, in a thirteenth possible implementation manner, the processor is specifically configured to send a setup request message of a communications interface between access points to the candidate AP according to the IP address of the candidate AP, so that the candidate AP sets up the communications interface between access points according to the setup request message of the communications interface.

With reference to the twelfth possible implementation manner, in a fourteenth possible implementation manner, the transmitter is further configured to: after the processor sets up the communications interface with the candidate AP according to the IP address, included in the setup accept message, of the candidate AP, send an update request or a reset request of a communications interface between access points to the candidate AP according to the IP address of the candidate AP, so that the candidate AP updates or resets the communications interface between access points according to the update request or the reset request.

According to a tenth aspect of the embodiments of the present invention, an apparatus for setting up a communications interface between access points is provided, including:

an acquirer, configured to acquire measurement information, where the measurement information includes interface information of at least one second AP, and the interface information includes an AP identifier of the second AP and a capability of supporting a communications interface between APs; and a transmitter, configured to report the measurement information to a first AP, so that the first AP determines M candidate APs according to the interface information in the measurement information.

With reference to the tenth aspect, in a first possible implementation manner, the interface information further includes interface type information; and the transmitter is specifically configured to report the measurement information to the first AP, so that the first AP determines the M candidate APs according to the interface type information in the interface information in the measurement information.

With reference to the first possible implementation manner, in a second possible implementation manner, the interface information further includes duration corresponding to an interface type in the interface type information; and the transmitter is specifically configured to report the measurement information to the first AP, so that the first AP determines the M candidate APs according to the interface type information in the measurement information and the duration corresponding to the interface type in the interface type information.

With reference to the tenth aspect or the first possible implementation manner or the second possible implementation manner, in a third possible implementation manner, the second AP includes an AP in an extended service set system and a coexistence system and a previously associated AP of a non-overlapping basic service set.

With reference to the tenth aspect or any possible implementation manner of the first to third possible implementation manners, in a fourth possible implementation manner, the transmitter is further configured to: before the acquirer acquires the measurement information, send an interface information request message to the at least one second AP, so that the at least one second AP sends an interface information response message according to the interface information request message, and the interface information response message includes the interface information.

With reference to the fourth possible implementation manner, in a fifth possible implementation manner, the interface information request message is carried in a probe request frame; and the interface information response message is carried in a probe response Probe Response frame.

With reference to the tenth aspect or any possible implementation manner of the first to third possible implementation manners, in a sixth possible implementation manner, the acquirer is further configured to: before acquiring the measurement information, periodically receive a beacon frame sent by the at least one second AP, where the Beacon frame carries the interface information of the second AP; and the acquirer is specifically configured to acquire the interface information of the at least one second AP from the Beacon frame sent by the at least one second AP.

According to an eleventh aspect of the embodiments of the present invention, an apparatus for setting up a communications interface between access points is provided, including:

a receiver, configured to receive a second request message sent by a first AP, where the second request message includes an AP identifier of at least one candidate AP;

a processor, configured to send, according to the second request message, a first request message to a candidate AP corresponding to the AP identifier, included in the second request message, of the at least one candidate AP, where the first request message is used for requesting the candidate AP for an IP address used for setting up a communications interface between APs; and a transmitter, configured to send a response message that is determined by the candidate AP according to the first request message to the first AP, so that the first AP determines, according to the response message, whether to set up a communications interface with the candidate AP that sends the response message.

With reference to the eleventh aspect, in a first possible implementation manner, the second request message further includes a target interface type;

the first request message includes the target interface type, and the first request message is used for requesting the candidate AP for an IP address used for setting up a communications interface between APs of the target interface type; and the transmitter is specifically configured to send to the first AP the response message that is determined by the candidate AP according to the target interface type.

With reference to the first possible implementation manner, in a second possible implementation manner, if the second request message includes an AP identifier of a candidate AP and the target interface type, the processor is specifically configured to send, according to the identifier, included in the second request message, of the candidate AP, the first request message to the candidate AP corresponding to the AP identifier of the candidate AP.

With reference to the first possible implementation manner, in a third possible implementation manner, if the second request message includes AP identifiers of at least two candidate APs and the target interface type, the processor is specifically configured to generate at least two first request messages according to the second request message; and send the first request messages respectively to candidate APs corresponding to the AP identifiers of the at least two candidate APs.

According to a twelfth aspect of the embodiments of the present invention, an apparatus for setting up a communications interface between access points is provided, including:

a receiver, configured to receive a first request message sent by an access controller AC, where the first request message is used for requesting the candidate AP for an Internet Protocol IP address used for setting up a communications interface between APs;

a processor, configured to determine, according to the first request message, a response message to be sent to the AC; and a transmitter, configured to send the response message to the AC, so that the AC forwards, to a first AP, the response message sent by the candidate AP, and the first AP determines, according to the response message, whether to set up a communications interface with the candidate AP that sends the response message.

With reference to the twelfth aspect, in a first possible implementation manner, the first request message includes a target interface type, where the target interface type is a type of an interface that the first AP requests to set up; and the processor is specifically configured to determine, according to the target interface type, the response message to be sent to the AC.

With reference to the first possible implementation manner, in a second possible implementation manner, the first request message further includes target duration, where the target duration is duration of the type of the interface that the first AP requests to set up; and the processor is specifically configured to determine, according to the target interface type and the target duration, the response message to be sent to the AC.

According to the method and the apparatus for setting up an interface between access points provided in the embodiments of the present invention, a first AP receives measurement information reported by at least one station associated with the first AP, determines a candidate AP according to interface information in the measurement information, and sends, to the candidate AP by using an AC, a first request message requesting an IP address used for setting up a communications interface between APs, the candidate AP sends, by using the AC, a response message to the first AP according to the first request message, and the first AP determines, according to the response message, whether to set up an AP-to-AP (AP2AP) communications interface with the candidate AP that sends the response message. Therefore, setup of a communications interface between APs in a WLAN system is implemented, and information exchange between APs is implemented by using the AP2AP interface.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In the embodiments of the present invention, a source AP receives measurement information reported by one or more stations associated with the source AP, the measurement information reported by each station includes interface information of one or more second APs, each piece of interface information includes an AP identifier of a second AP and a capability of supporting a communications interface between APs, and the capability of supporting a communications interface between APs refers to that an AP has a capability of supporting setup of a communications interface between APs and communication, and therefore, the source AP may learn, according to the measurement information, an AP identifier of a second AP having a capability of setup of a communications interface between APs and communication. Then, the source AP may determine an AP identifier of a candidate AP according to the interface information in the measurement information, and sends, to the candidate AP by using an AC, a request message requesting an IP address used for setting up a communications interface between APs, so that the candidate AP sends, by using the AC, a response message to the source AP according to the request message, and the source AP determines, according to the response message, whether to set up an AP2AP communications interface with the candidate AP that sends the response message. For ease of description, a communications interface between APs is referred to as an AP2AP interface in following, that is, an interface for direct communication between APs, and a large quantity of real-time information exchange between APs is implemented by using the AP2AP interface.

Technical solutions of the present invention are described in detail below by using several specific embodiments.

Figure 1:
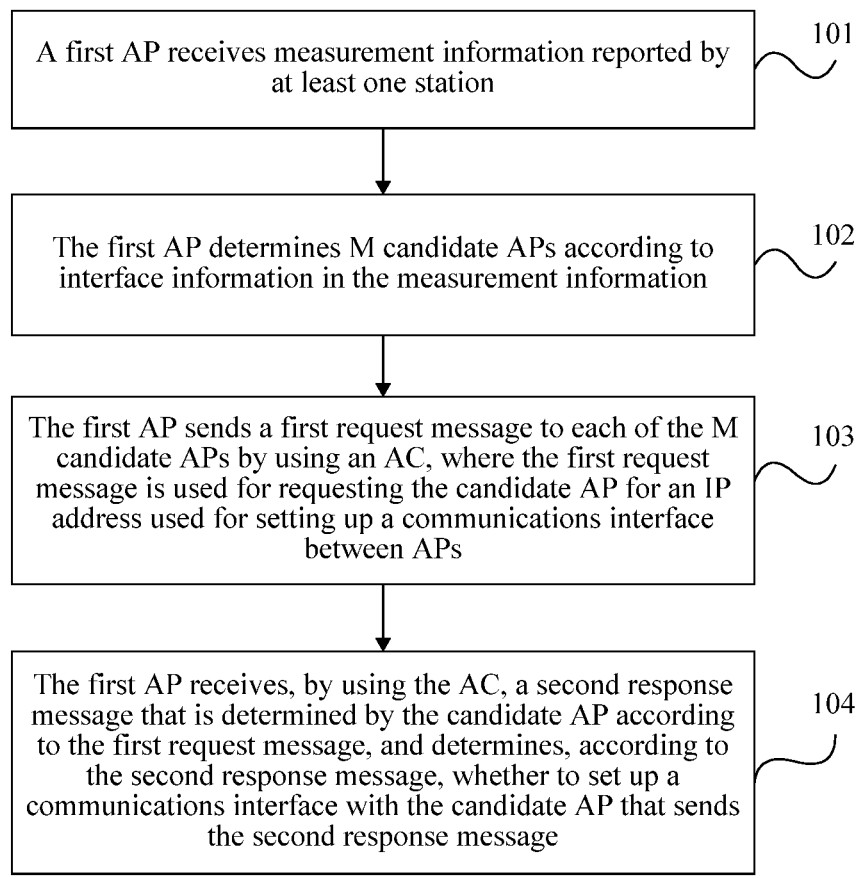
FIG. 1 is a schematic flowchart of Embodiment 1 of a method for setting up a communications interface between access points according to the present invention.

FIG. 1 is a schematic flowchart of Embodiment 1 of a method for setting up a communications interface between access points according to the present invention. In this embodiment, an AP actively initiating setup of an AP2AP interface in a WLAN system is referred to as a source AP, that is, a first AP, an AP having a capability of supporting a communications interface between APs is referred to as a second AP, that is, the second AP has a capability of supporting setup of an AP2AP interface and communication, and this embodiment is performed by the first AP. As shown in FIG. 1, the method of this embodiment includes:

S101: The first AP receives measurement information reported by at least one station.

The measurement information includes interface information of at least one second AP, and the interface information of the second AP includes an AP identifier of the second AP and a capability of supporting a communications interface between APs, that is, the second AP has a capability of supporting setup of an AP2AP interface and communication.

S102: The first AP determines M candidate APs according to the interface information in the measurement information.

M is an integer greater than or equal to 1.

Specifically, all already learned second APs may be used as candidate APs, and AP identifiers of all the second APs are used as AP identifiers of the candidate APs.

Alternatively, some APs of the already learned second APs may be used as candidate APs according to a preset rule, and AP identifiers of the some APs are used as AP identifiers of the candidate APs. No specific implementation manner is limited in the present invention.

S103: The first AP sends a first request message to each of the M candidate APs by using an AC, where the first request message is used for requesting the candidate AP for an IP address used for setting up a communications interface between APs.

The first request message is used for requesting the candidate AP for an Internet Protocol (IP) address used for setting up a communications interface between APs, and after receiving the first request message, each candidate AP may determine, according to the first request message, a response message to be sent to the AC. For example, the candidate AP may determine, according to a resource status of the candidate AP, whether to agree to set up an AP2AP interface with the source AP. If the candidate AP agrees to set up an AP2AP interface with the source AP, the response message to be sent to the AC is a setup accept message, where the setup accept message includes the IP address of the candidate AP, and the first AP sets up, according to the IP address in the setup accept message, an AP2AP interface of a target interface type with the candidate AP that sends the setup accept message. If the candidate AP disagrees to set up an AP2AP interface with the source AP, the response message to be sent to the AC is a setup reject message, and the first AP does not set up an AP2AP interface with the candidate AP that sends the setup reject message.

In this step, the source AP sends the first request message to each of the M candidate APs by using the AC, which may be specifically: the source AP sends N second request messages to the access controller AC, each second request message includes an AP identifier of at least one candidate AP, $1 \leq N \leq M$, a total quantity of AP identifiers, included in the N second request messages, of candidate APs is M, and the AC sends, according to the second request message, the first request message to a candidate AP corresponding to the AP identifier, included in the second request message, of the at least one candidate AP.

In one of feasible implementation manners, the source AP may send, for each candidate AP, the second request message to the AC, where each second request message includes an AP identifier of a candidate AP, so that the AC sends, according to the identifier, included in the second request message, of the candidate AP, the first request message to the candidate AP corresponding to the AP identifier of the candidate AP, and the candidate AP determines, according to the first request message, the response message to be sent to the AC, where the first request message is the same as the second request message. Optionally, the first request message may be a request message acquired after the identifier of the candidate AP is deleted from the second request message, that is, the second request message in which the AP identifier is deleted is used as the first request message.

In another feasible implementation manner, the source AP sends N second request messages to the AC, where each second request message includes AP identifiers of at least two of the candidate APs, so that the AC sends, according to the AP identifiers, included in the second request message, of the at least two of the candidate APs, the first request message to each of the candidate APs corresponding to the AP identifiers of the at least two of the candidate APs, where the first request message is used for requesting the candidate AP for an IP address used for setting up a communications interface between APs, so that the candidate AP determines, according to the first request message, a response message to be sent to the AC, where $1 \leq N \leq M$, and a total quantity of the AP identifiers, included in the N second request messages, of the candidate APs is M.

S104: The first AP receives, by using the AC, a response message that is determined by the candidate AP according to the first request message, and determines, according to the response message, whether to set up a communications interface with the candidate AP that sends the response message.

Specifically, if the response message is the setup accept message, and the setup accept message includes the IP address of the candidate AP, the first AP sets up, according to the IP address in the setup accept message, an AP2AP interface of a target interface type with the candidate AP that sends the setup accept message. If the response message is the setup reject message, the first AP does not set up an AP2AP interface with the candidate AP that sends the setup reject message.

In this embodiment, a first AP receives measurement information reported by at least one station associated with the first AP, to learn an AP identifier of a second AP having a capability of supporting an AP2AP interface, determines a candidate AP according to interface information in the measurement information, and sends, to the candidate AP by using an AC, a first request message requesting an IP address used for setting up a communications interface between APs, the candidate AP sends, by using the AC, a response message to the first AP according to the first request message, and the first AP determines, according to the response message, whether to set up an AP2AP communications interface with the candidate AP that sends the response message. Therefore, setup of a communications interface between APs in a WLAN system, that is, setup of an AP2AP interface is implemented and a large quantity of real-time information exchange between APs is implemented by using the AP2AP interface.

Figure 2:
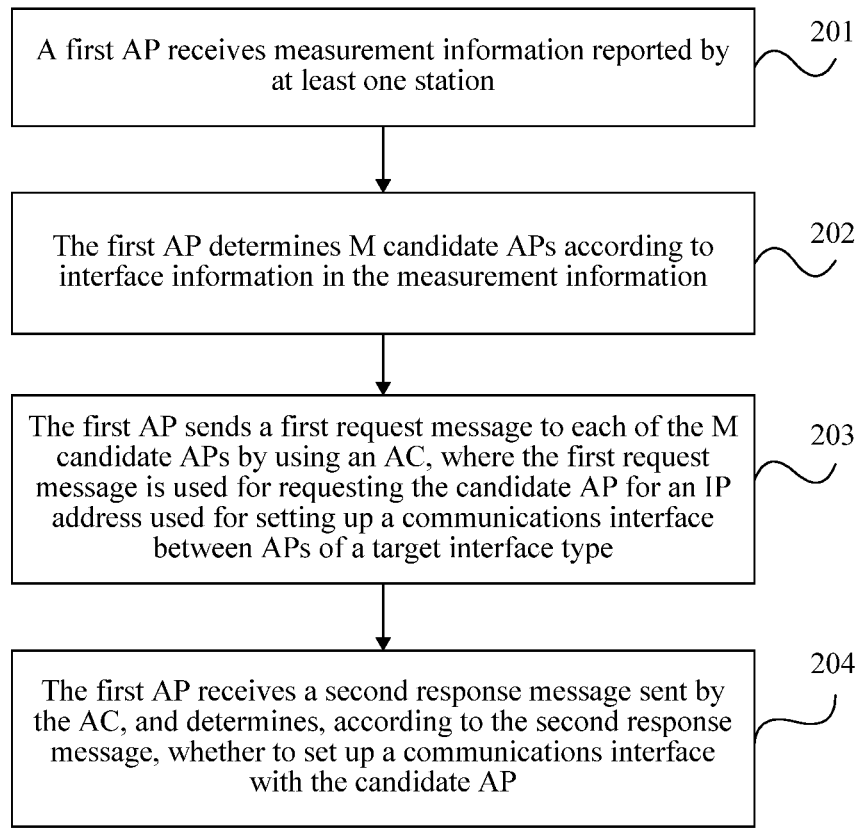
FIG. 2 is a schematic flowchart of Embodiment 2 of a method for setting up a communications interface between access points according to the present invention.

FIG. 2 is a schematic flowchart of Embodiment 2 of a method for setting up a communications interface between access points according to the present invention. In this embodiment, an AP actively initiating setup of an AP2AP interface in a WLAN system is referred to as a source AP, that is, a first AP, an AP having a capability of supporting a communications interface between APs is referred to as a second AP, that is, the second AP has a capability of supporting setup of an AP2AP interface and communication, and this embodiment is performed by the first AP. This embodiment is different from the embodiment shown in FIG. 1 in that, in this embodiment, the first AP requests to set up an AP2AP interface of a specific interface type (target interface type) with a candidate AP. As shown in FIG. 2, the method of this embodiment includes:

S201: The first AP receives measurement information reported by at least one station.

The measurement information includes interface information of at least one second AP. The second AP has a capability of supporting a communications interface between APs, that is, the second AP has a capability of supporting setup of an AP2AP interface and communication.

In a feasible implementation manner, the interface information includes an AP identifier of the second AP and the capability of supporting a communications interface between APs. According to this step, the first AP may learn the AP identifier of the second AP having the capability of supporting setup of an AP2AP interface and communication.

In another feasible implementation manner, on the basis of the first feasible implementation manner, the interface information further includes interface type information. The interface type information may include one or more of coordinated transmission, interference management, resource scheduling, and service continuity. According to this step, the first AP may learn the AP identifier of the second AP having the capability of supporting setup of an AP2AP interface and communication and the information about a supported interface type.

In still another feasible implementation manner, on the basis of the second feasible implementation manner, the interface information further includes duration corresponding to an interface type in the interface type information. According to this step, the first AP may learn the AP identifier of the second AP having the capability of supporting setup of an AP2AP interface and communication, the information about a supported interface type and the duration corresponding to the supported interface type. The duration corresponding to the interface type refers to duration during which the second AP supports setup of a type of an interface, for example, if duration during which the second AP supports an interface of an interference management type is 500 minutes, duration of an interface of the interference management type that may be set up by the second AP with another AP is a maximum of 500 minutes, and if a time exceeds 500 minutes, the second AP does not support the capability of setting up an interface of the interference management type. Therefore, the first AP may determine a candidate AP by using the duration corresponding to the interface type, and the candidate AP may also determine, according to duration corresponding to an interface type of the candidate AP, whether to set up an interface of a specific interface type with the first AP.

S202: The first AP determines M candidate APs according to the interface information in the measurement information.

M is an integer greater than or equal to 1.

When the interface information includes the AP identifier of the second AP and the capability of supporting a communications interface between APs, all already learned second APs may be used as candidate APs, and AP identifiers of all the second APs are used as AP identifiers of the candidate APs. Alternatively, some APs of the already learned second APs may be used as candidate APs according to a preset rule, and AP identifiers of the some APs are used as AP identifiers of the candidate APs. No specific implementation manner is limited in the present invention.

When the interface information includes the AP identifier of the second AP, the capability of supporting a communications interface between APs and the interface type information, it may be determined that a second AP whose interface type information in the measurement information reported by the at least one station includes a target interface type is a candidate AP, that is, if the interface type information in the measurement information includes the target interface type, the first AP determines that M second APs corresponding to the measurement information are the M candidate APs.

The target interface type refers to a type of an interface that the first AP requests to set up, and the target interface type also includes one or more of coordinated transmission, interference management, resource scheduling, and service continuity.

For example, when the first AP needs to set up an interface of a coordinated transmission type with a second AP, the target interface type includes coordinated transmission, and it is determined that a second AP whose interface type information in the measurement information includes coordinated transmission is a candidate AP; when the first AP needs to set up an interface of an interference management and resource scheduling type with a second AP, if the target interface type includes interference management and resource scheduling, it is determined that a second AP whose interface type information in the measurement information includes interference management and resource scheduling is a candidate AP.

When the interface information includes the AP identifier of the second AP and the interface type information, the determining AP identifiers of M candidate APs according to the interface information in the measurement information is substantially performing matching between the interface type information in the measurement information and the target interface type, and selecting, by means of screening, an AP identifier of a candidate AP that may set up an interface of the target interface type with the first AP. The screening performed by using the target interface type can reduce network resource waste caused due to sending request information to an unnecessary second AP.

When the interface information includes the AP identifier of the second AP, the capability of supporting a communications interface between APs, the interface type information and the duration corresponding to the interface type in the interface type information, it may be determined that AP identifiers of M second APs whose interface type information in the measurement information reported by the at least one station includes a target interface type and for which duration corresponding to the target interface type included in the interface type information is greater than target duration are AP identifiers of the M candidate APs, where the target duration is duration of the type of the interface that the first AP requests to set up, that is, if the interface type information in the measurement information includes the target interface type, and the duration corresponding to the target interface type included in the interface type information is greater than the target duration, the first AP determines that M second APs corresponding to the measurement information are the M candidate APs.

For example, if the first AP requests to set up an interface of a coordinated transmission type with a second AP, and the interface needs to be set up for 20 minutes, the coordinated transmission type is the target interface type, the 20 minutes is the target duration, and AP identifiers, acquired by the first AP from the measurement information reported by the at least one station, of M second APs whose interface type information include the coordinated transmission type and for which duration of the coordinated transmission type is greater than 20 minutes are AP identifiers of the M candidate APs. The step is substantially performing screening by using the interface type information in the measurement information, duration corresponding to an interface type, a target interface type and target duration, and determining an AP identifier of an AP that may set up an interface of the target interface type and of the target duration with the first AP. The screening performed by using the target interface type and the target duration can further reduce network resource waste caused due to sending request information to an unnecessary second AP.

S203: The first AP sends a first request message to each of the M candidate APs by using an AC, where the first request message is used for requesting the candidate AP for an IP address used for setting up a communications interface between APs of a target interface type.

The first request message includes the target interface type, so that the candidate AP determines, according to the target interface type in the first request message, a response message to be sent to the AC.

In one of feasible implementation manners, the first AP sends, for each candidate AP, a second request message to the AC, where each second request message includes an AP identifier of one of the candidate APs and the target interface type, so that the AC sends, according to the identifier, included in the second request message, of the candidate AP, the first request message to the candidate AP corresponding to the AP identifier of the candidate AP, and the candidate AP determines, according to the target interface type in the first request message, the response message to be sent to the AC.

In another feasible implementation manner, the first AP sends N second request messages to the AC, where each second request message includes AP identifiers of at least two of the candidate APs and the target interface type, so that the AC sends, according to the AP identifiers, included in the second request message, of the at least two of the candidate APs, the first request message to each of the candidate APs corresponding to the AP identifiers of the at least two of the candidate APs, where the first request message is used for requesting the candidate AP for an IP address used for setting up a communications interface between APs of the target interface type, so that the candidate AP determines, according to the target interface type in the first request message, the response message to be sent to the AC, where 1≤N≤M, and a total quantity of the AP identifiers, included in the N second request messages, of the candidate APs is M.

After receiving the first request message, the candidate AP may determine, according to the target interface type, and an interface resource, load information and the like of the candidate AP, whether to set up an AP2AP interface of the target interface type with the first AP. If the candidate AP accepts the setting up an AP2AP interface of the target interface type with the first AP, the response message to be sent to the AC is a setup accept message, where the setup accept message includes the IP address of the candidate AP, and the AC forwards the setup accept message to the first AP; or if the candidate AP rejects the setting up an AP2AP interface of the target interface type with the first AP, the response message to be sent to the AC is a setup reject message, and the AC forwards the setup reject message to the first AP.

Further, in addition to information about the target interface type, the first request message may further include target duration, where the target duration is duration of a type of an interface that the first AP requests to set up, and the candidate AP may determine, according to the target interface type and the target duration in the first request message, the response message to be sent to the AC. After receiving the first request message, the candidate AP may determine, according to the target interface type, the target duration, and an interface resource, load information and duration corresponding to an interface type and the like of the candidate AP, whether to set up an AP2AP interface of the target interface type with the first AP. If the candidate AP accepts the setting up an AP2AP interface of the target interface type with the first AP, the response message to be sent to the AC is a setup accept message, where the setup accept message includes the IP address of the candidate AP, and the AC forwards the setup accept message to the first AP; or if the candidate AP rejects the setting up an AP2AP interface of the target interface type with the first AP, the response message to be sent to the AC is a setup reject message, and the AC forwards the setup reject message to the first AP. By means of determining duration of an interface, an AP can dynamically set up an interface based on an interface resource status of the AP, which effectively improves utilization of an interface resource (such as a port number) needed for setting up an interface between APs, and is particularly favorable to a scenario in which APs are densely deployed.

S204: The first AP receives the response message sent by the AC, and determines, according to the response message, whether to set up a communications interface with the candidate AP.

Specifically, if the response message is the setup accept message, and the setup accept message includes the IP address of the candidate AP, the first AP sets up, according to the IP address in the setup accept message, an AP2AP interface of the target interface type with the candidate AP that sends the setup accept message.

If the response message is the setup reject message, the first AP does not set up an AP2AP interface with the candidate AP that sends the setup reject message.

In this embodiment, a first AP receives measurement information reported by at least one station associated with the first AP, to learn an AP identifier and interface type information of a second AP having a capability of supporting an AP2AP interface, determines M candidate APs according to interface information in the measurement information, and sends, to each candidate AP by using an AC, a first request message for requesting an IP address used for setting up an AP2AP interface of a target interface type, so that the candidate AP determines, according to the target interface type, a response message to be sent to the AC, and the first AP receives the response message forwarded by the AC, and determines, according to the response message, whether to set up a communications interface with the candidate AP. Therefore, setup of a communications interface between APs in a WLAN system, that is, setup of an AP2AP interface is implemented and a large quantity of real-time information exchange between APs is implemented by using the AP2AP interface.

Figure 3:
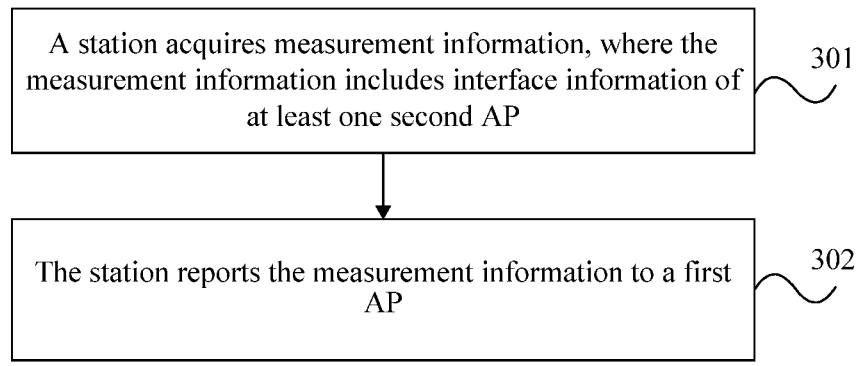
FIG. 3 is a schematic flowchart of Embodiment 3 of a method for setting up a communications interface between access points according to the present invention.

FIG. 3 is a schematic flowchart of Embodiment 3 of a method for setting up a communications interface between access points according to the present invention. The embodiment shown in FIG. 3 is performed by a station (STA). As shown in FIG. 3, the method of this embodiment includes:

S301: The station acquires measurement information, where the measurement information includes interface information of at least one second AP, and the interface information of the second AP includes an AP identifier of the second AP and a capability of supporting a communications interface between APs.

Interface information of each second AP may include the AP identifier of the second AP and the capability of supporting a communications interface between APs. An AP has the capability of supporting a communications interface between APs, that is, has a capability of supporting setup of an AP2AP interface and communication.

The second AP includes an AP, having the capability of supporting a communications interface between APs, in an extended service set system and a coexistence system, and an AP, having the capability of supporting a communications interface between APs, in a non-overlapping basic service set and previously associated with a station.

Interface information of the AP, having the capability of supporting a communications interface between APs, in the extended service set system and the coexistence system may be obtained in the following two implementation manners:

First manner: An interface information request message is sent to the second AP in the extended service set system and the coexistence system, where the interface information request message may be carried in a probe request (Probe Request) frame, so that the AP in the extended service set system and the coexistence system feeds back an interface information response message to the station, where the interface information response message may be carried in a probe response (Probe Response) frame and the interface information response message includes an AP identifier, and only the AP (the second AP) having the capability of supporting a communications interface between APs sends the interface information response message including the AP identifier.

Second manner: A beacon frame of an interface information response message that is sent by the AP in the extended service set system and the coexistence system and that includes an AP identifier and interface type information is periodically received, and only the AP (the second AP) having the capability of supporting a communications interface between APs sends the Beacon frame including the AP identifier, and the interface information of the at least one second AP is acquired from the Beacon frame sent by the at least one second AP.

The acquiring an AP identifier of the AP, having the capability of supporting a communications interface between APs, in the non-overlapping basic service set and previously associated with the station is: The station acquires, from the non-overlapping basic service set, the AP identifier of the AP having the capability of supporting a communications interface between APs, and reports the AP identifier to the AP associated with a current location of the station. A manner in which the station acquires, in the non-overlapping basic service set, the AP identifier of the AP having the capability of supporting a communications interface between APs may be the foregoing first manner or the foregoing second manner.

S302: The station reports the measurement information to a first AP.

The first AP determines AP identifiers of M candidate APs according to the interface information in the measurement information.

In this embodiment, a station acquires an AP identifier of a second AP having a capability of supporting an AP2AP interface, and AP measurement information, reports the measurement information to a first AP, so that the first AP determines M candidate APs according to interface information in the measurement information, and therefore may send a second request message including an identifier of a candidate AP to an AC, so that the AC sends a first request message to the candidate AP according to the AP identifier of the candidate AP, and the candidate AP determines, according to the first request message, a response message to be sent to the AC, and the first AP receives the response message forwarded by the AC, and determines, according to the response message, whether to set up a communications interface with the candidate AP that sends the response message. Therefore, setup of an AP2AP interface between APs in a WLAN system is implemented and a large quantity of real-time information exchange between APs is implemented by using the AP2AP interface.

Figure 4:
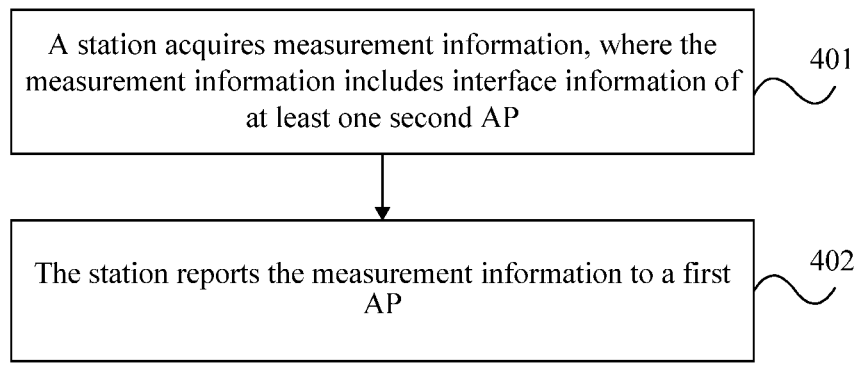
FIG. 4 is a schematic flowchart of Embodiment 4 of a method for setting up a communications interface between access points according to the present invention.

FIG. 4 is a schematic flowchart of Embodiment 4 of a method for setting up a communications interface between access points according to the present invention. The embodiment shown in FIG. 4 is performed by a STA, and this embodiment is different from the embodiment shown in FIG. 3 in that, interface information in this embodiment further includes interface type information of a second AP, or further includes interface type information and duration corresponding to the interface type information. As shown in FIG. 4, the method of this embodiment includes:

S401: The station acquires measurement information, where the measurement information includes interface information of at least one second AP, and the interface information includes an AP identifier of the second AP, a capability of supporting a communications interface between APs and interface type information.

Each piece of interface information includes the AP identifier of the second AP, the capability of supporting a communications interface between APs and the interface type information. Alternatively, each piece of interface information includes the AP identifier of the second AP, the capability of supporting a communications interface between APs, the interface type information and duration corresponding to the interface type information. The second AP includes an AP, having the capability of supporting a communications interface between APs, in an extended service set system and a coexistence system, and an AP, having the capability of supporting a communications interface between APs, in a non-overlapping basic service set and previously associated with a station.

Interface information of the AP, having the capability of supporting a communications interface between APs, in the extended service set system and the coexistence system may be obtained in the following two implementation manners:

First manner: An interface information request message is sent to the second AP in the extended service set system and the coexistence system, where the interface information request message may be carried in a probe request (Probe Request) frame, so that the AP in the extended service set system and the coexistence system feeds back an interface information response message to the station, where the interface information response message may be carried in a probe response (Probe Response) frame and the interface information response message includes an AP identifier and interface type information, and only the AP (the second AP) having the capability of supporting a communications interface between APs sends the interface information response message including the AP identifier and the interface type information.

Second manner: A beacon (Beacon) frame of an interface information response message that is sent by the AP in the extended service set system and the coexistence system and that includes an AP identifier and interface type information is periodically received, and only the AP (the second AP) having the capability of supporting a communications interface between APs sends the Beacon frame including the AP identifier and the interface type information, and the interface information of the at least one second AP is acquired from the Beacon frame sent by the at least one second AP.

The acquiring an AP identifier and interface type information of the AP, having the capability of supporting a communications interface between APs, in the non-overlapping basic service set and previously associated with the station is: The station carries the AP identifier and the interface type information, acquired in the non-overlapping basic service set by the station, of the AP having the capability of supporting a communications interface between APs to a current location of the station, and reports the AP identifier to the AP associated with the current location. A manner in which the station acquires, in the non-overlapping basic service set, the AP identifier and the interface type information of the AP having the capability of supporting a communications interface between APs may be the foregoing first manner or the foregoing second manner.

S402: The station reports the measurement information to a first AP.

The first AP determines an AP identifier of a candidate AP according to the interface type information in the interface information in the measurement information.

In this embodiment, a station acquires an AP identifier of a second AP having a capability of supporting an AP2AP interface, and AP measurement information, reports the measurement information to a first AP, so that the first AP determines a candidate AP according to interface type information in interface information in the measurement information, and therefore may send a second request message including an identifier of the candidate AP and a target interface type to an AC, so that the AC sends a first request message including the target interface type to the candidate AP according to the AP identifier of the candidate AP, and the candidate AP determines, according to the target interface type, a response message to be sent to the AC, and the first AP receives the response message forwarded by the AC, and determines, according to the response message, whether to set up a communications interface with the candidate AP that sends the response message. Therefore, setup of an AP2AP interface between APs in a WLAN system is implemented and a large quantity of real-time information exchange between APs is implemented by using the AP2AP interface.

Figure 5:
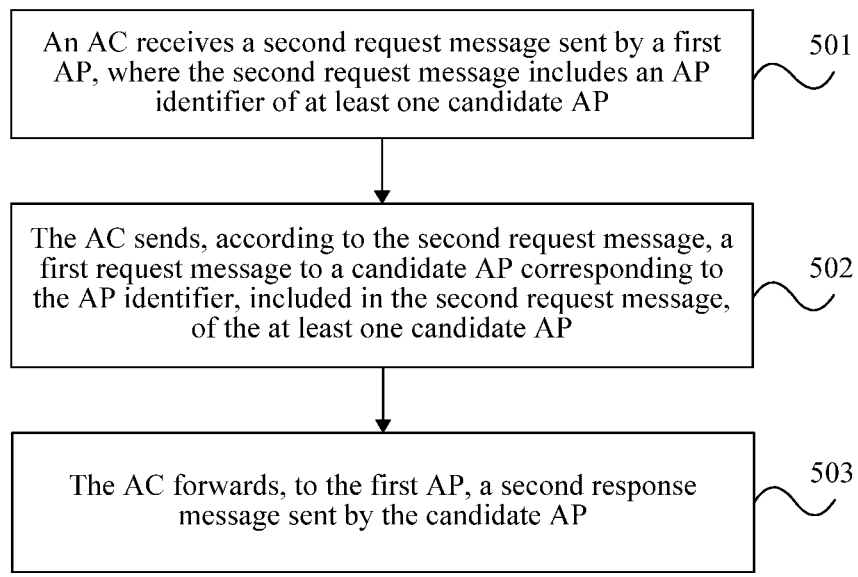
FIG. 5 is a schematic flowchart of Embodiment 5 of a method for setting up a communications interface between access points according to the present invention.

FIG. 5 is a schematic flowchart of Embodiment 5 of a method for setting up a communications interface between access points according to the present invention. The embodiment shown in FIG. 5 is performed by an AC. As shown in FIG. 5, the method of this embodiment includes:

S501: The AC receives a second request message sent by a first AP, where the second request message includes an AP identifier of at least one candidate AP.

The AP identifier of the candidate AP is AP identifiers of M candidate APs determined by the first AP according to interface information in measurement information.

S502: The AC sends, according to the second request message, a first request message to a candidate AP corresponding to the AP identifier, included in the second request message, of the at least one candidate AP.

The first request message is used for requesting the candidate AP for an IP address used for setting up a communications interface between APs. After receiving the first request message, the candidate AP determines, according to the first request message, a response message to be sent to the AC.

In one of feasible implementation manners, for each candidate AP, the first AP sends a second request message to the AC, where the second request message includes an AP identifier of a candidate AP; and after receiving the second request message, the AC directly forwards the second request message to the candidate AP according to the AP identifier of the candidate AP, that is, the first request message is the same as the second request message.

In another feasible implementation manner, for each candidate AP, the first AP sends a second request message to the AC, where the second request message includes an AP identifier of a candidate AP; and after receiving the second request message and reading the AP identifier of the candidate AP in the second request message, the AC deletes the AP identifier of the candidate AP in the second request message, then uses the second request message in which the AP identifier of the candidate AP is deleted as the first request message, and sends the first request message to the candidate AP according to the AP identifier of the candidate AP.

In still another feasible implementation manner, the second request message includes AP identifiers of at least two candidate APs; and after receiving the second request message, the AC generates at least two first request messages according to the second request message, and respectively sends the first request messages to candidate APs corresponding to the AP identifiers of the at least two candidate APs.

S503: The AC forwards, to the first AP, the response message sent by the candidate AP.

After receiving the first request message, the candidate AP may determine, according to an interface resource, load information and the like of the candidate AP, whether to set up an AP2AP interface with the first AP. If the candidate AP accepts the setting up an AP2AP interface with the first AP, the response message to be sent to the AC is a setup accept message, where the setup accept message includes the IP address of the candidate AP, and the AC forwards the setup accept message to the first AP; or if the candidate AP rejects the setting up an AP2AP interface with the first AP, the response message to be sent to the AC is a setup reject message, and the AC forwards the setup reject message to the first AP.

The first AP determines, according to the response message, whether to set up a communications interface with the candidate AP. Specifically, if the response message is the setup accept message, and the setup accept message includes the IP address of the candidate AP, the first AP sets up, according to the IP address in the setup accept message, an AP2AP interface with the candidate AP that sends the setup accept message. If the response message is the setup reject message, the first AP does not set up an AP2AP interface with the candidate AP that sends the setup reject message.

In this embodiment, an AC sends, according to an AP identifier of a candidate AP in a second request message, a first request message to the candidate AP, so that the candidate AP determines a response message according to the first request message. A first AP receives the response message forwarded by the AC, and determines, according to the response message, whether to set up a communications interface with the candidate AP. Therefore, setup of an AP2AP interface between APs in a WLAN system is implemented and a large quantity of real-time information exchange between APs is implemented by using the AP2AP interface.

Figure 6:
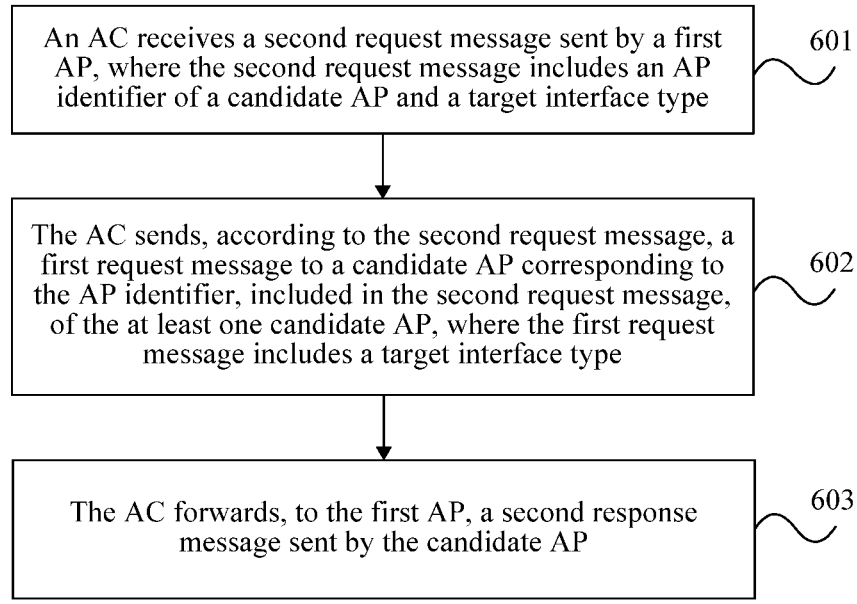
FIG. 6 is a schematic flowchart of Embodiment 6 of a method for setting up a communications interface between access points according to the present invention.

FIG. 6 is a schematic flowchart of Embodiment 6 of a method for setting up a communications interface between access points according to the present invention. The embodiment shown in FIG. 6 is performed by an AC, and a second request message sent by a first AP and received by the AC of this embodiment includes a target interface type, that is, the first AP in this embodiment requests, from a second AP, an IP address used for setting up an AP2AP interface of the target interface type. As shown in FIG. 6, the method of this embodiment includes:

S601: The AC receives a second request message sent by a first AP, where the second request message includes an AP identifier of a candidate AP and a target interface type.

Specifically, the target interface type refers to a type of an interface that the first AP requests to set up. The first AP determines that an AP identifier of a second AP whose interface type information in measurement information includes the target interface type is the AP identifier of the candidate AP.

S602: The AC sends, according to the second request message, a first request message to a candidate AP corresponding to an AP identifier, included in the second request message, of at least one candidate AP, where the first request message includes the target interface type.

In one of feasible implementation manners, for each candidate AP, the first AP sends a second request message to the AC, where the second request message includes an AP identifier of a candidate AP and the target interface type; and after receiving the second request message, the AC directly forwards the second request message to the candidate AP according to the AP identifier of the candidate AP, that is, the first request message is the same as the second request message.

In another feasible implementation manner, the second request message may include AP identifiers of one or more candidate APs and the target interface type; and after receiving the second request message and reading the AP identifier of the candidate AP in the second request message, the AC deletes the AP identifier of the candidate AP in the second request message, reserves the target interface type in the second request message, then uses the second request message in which the AP identifier of the candidate AP is deleted and the target interface type is reserved as the first request message, and sends the first request message to the candidate AP according to the AP identifier of the candidate AP.

In still another feasible implementation manner, the second request message includes AP identifiers of at least two candidate APs and the target interface type; and after receiving the second request message, the AC generates at least two first request messages according to the second request message, where the first request message includes the target interface type, and respectively sends the first request messages to candidate APs corresponding to the AP identifiers of the at least two candidate APs.

S603: The AC forwards, to the first AP, a response message sent by the candidate AP.

After receiving the first request message including the target interface type, the candidate AP may determine, according to the target interface type and an interface resource, load information and the like of the candidate AP, whether to set up an AP2AP interface of the target interface type with the first AP. If the candidate AP accepts the setting up an AP2AP interface of the target interface type with the first AP, the response message to be sent to the AC is a setup accept message, where the setup accept message includes the IP address of the candidate AP, and the AC forwards the setup accept message to the first AP; or if the candidate AP rejects the setting up an AP2AP interface of the target interface type with the first AP, the response message to be sent to the AC is a setup reject message, and the AC forwards the setup reject message to the first AP.

The first AP determines, according to the response message, whether to set up a communications interface with the candidate AP. Specifically, if the response message is the setup accept message, and the setup accept message includes the IP address of the candidate AP, the first AP sets up, according to the IP address in the setup accept message, an AP2AP interface of the target interface type with the candidate AP that sends the setup accept message. If the response message is the setup reject message, the first AP does not set up an AP2AP interface with the candidate AP that sends the setup reject message.

In this embodiment, an AC sends, according to an AP identifier of a candidate AP in a second request message, a first request message including a target interface type to the candidate AP, so that the candidate AP determines a response message according to the target interface type in the first request message. A first AP receives the response message forwarded by the AC, and determines, according to the response message, whether to set up a communications interface with the candidate AP. Therefore, setup of an AP2AP interface between APs in a WLAN system is implemented and a large quantity of real-time information exchange between APs is implemented by using the AP2AP interface.

In the embodiment, the second request message sent by the first AP and received by the AC may also include a target interface type and target duration, that is, the first AP requests, from the second AP, an IP address used for setting up an AP2AP interface of the target interface type of the target duration, and correspondingly, the candidate AP determines the response message according to the target interface type and the target duration in the first request message. An implementation principle thereof is similar to that of the embodiment shown in FIG. 6, and details are not described herein again.

Figure 7:
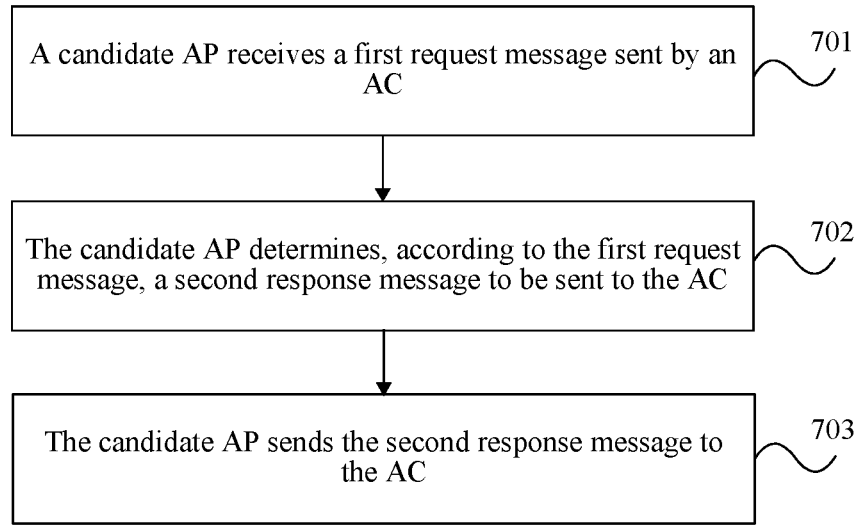
FIG. 7 is a schematic flowchart of Embodiment 7 of a method for setting up a communications interface between access points according to the present invention.

FIG. 7 is a schematic flowchart of Embodiment 7 of a method for setting up a communications interface between access points according to the present invention. The embodiment shown in FIG. 7 is performed by a candidate AP. As shown in FIG. 7, the method of this embodiment includes:

S701: The candidate AP receives a first request message sent by an AC.

The first request message is used for requesting the candidate AP for an Internet Protocol IP address used for setting up a communications interface between APs.

S702: The candidate AP determines, according to the first request message, a response message to be sent to the AC.

After receiving the first request message, the candidate AP may determine, according to an interface resource, load information and the like of the candidate AP, whether to set up an AP2AP interface with a first AP. If the candidate AP accepts the setting up an AP2AP interface with the first AP, the response message to be sent to the AC is a setup accept message, where the setup accept message includes the IP address of the candidate AP. If the candidate AP rejects the setting up an AP2AP interface with the first AP, the response message to be sent to the AC is a setup reject message.

S703: The candidate AP sends the response message to the AC.

The AC forwards, to the first AP, the response message sent by the candidate AP, and the first AP determines, according to the response message, whether to set up a communications interface with the candidate AP.

Specifically, if the response message is the setup accept message, and the setup accept message includes the IP address of the candidate AP, the first AP sets up, according to the IP address in the setup accept message, an AP2AP interface with the candidate AP that sends the setup accept message. If the response message is the setup reject message, the first AP does not set up an AP2AP interface with the candidate AP that sends the setup reject message.

In this embodiment, a candidate AP determines a response message according to a first request message, and sends the response message to an AC, and the AC forwards the response message to a first AP, so that the first AP determines, according to the response message, whether to set up a communications interface with the candidate AP. Therefore, setup of an AP2AP interface between APs in a WLAN system is implemented and a large quantity of real-time information exchange between APs is implemented by using the AP2AP interface.

Figure 8:
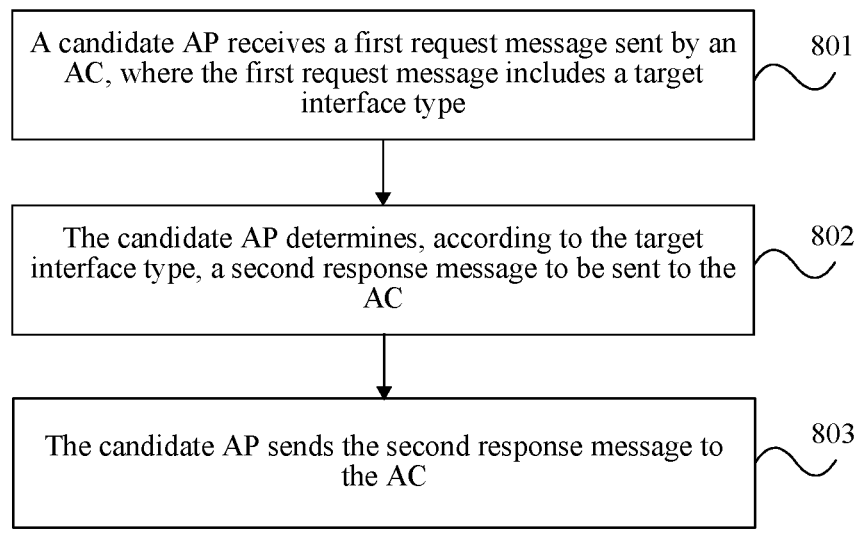
FIG. 8 is a schematic flowchart of Embodiment 8 of a method for setting up a communications interface between access points according to the present invention.

FIG. 8 is a schematic flowchart of Embodiment 8 of a method for setting up a communications interface between access points according to the present invention. The embodiment shown in FIG. 8 is performed by a candidate AP, and this embodiment is different from the embodiment shown in FIG. 7 in that, in this embodiment, a first request message received by an AP includes a target interface type. As shown in FIG. 8, the method of this embodiment includes:

S801: The candidate AP receives a first request message sent by an AC, where the first request message includes a target interface type.

The target interface type refers to a type of an interface that a first AP requests to set up.

S802: The candidate AP determines, according to the target interface type, a response message to be sent to the AC.

After receiving the first request message including the target interface type, the candidate AP may determine, according to the target interface type and an interface resource, load information and the like of the candidate AP, whether to set up an AP2AP interface of the target interface type with the first AP. If the candidate AP accepts the setting up an AP2AP interface of the target interface type with the first AP, the response message to be sent to the AC is a setup accept message, where the setup accept message includes the IP address of the candidate AP. If the candidate AP rejects the setting up an AP2AP interface of the target interface type with the first AP, the response message to be sent to the AC is a setup reject message.

S803: The candidate AP sends the response message to the AC.

Therefore, the AC forwards, to the first AP, the response message sent by the candidate AP, and the first AP determines, according to the response message, whether to set up a communications interface with the candidate AP.

Specifically, if the response message is the setup accept message, and the setup accept message includes the IP address of the candidate AP, the first AP sets up, according to the IP address in the setup accept message, an AP2AP interface of the target interface type with the candidate AP that sends the setup accept message. If the response message is the setup reject message, the first AP does not set up an AP2AP interface with the candidate AP that sends the setup reject message.

In this embodiment, a candidate AP determines, according to a target interface type, a response message to be sent to an AC. Specifically, the candidate AP performs matching between a target interface type in a first request message and interface resource information, load information and the like of the candidate AP, determines whether to set up an AP2AP communications interface with a first AP, and sends the response message to the AC, and the AC forwards the response message to the first AP, so that the first AP determines, according to the response message, whether to set up a communications interface with the candidate AP. Therefore, setup of an AP2AP interface between APs in a WLAN system is implemented and a large quantity of real-time information exchange between APs is implemented by using the AP2AP interface.

In the embodiment, the first request message may also include a target interface type and target duration, that is, the first AP requests, from the second AP, an IP address used for setting up an AP2AP interface of the target interface type of the target duration, and correspondingly, the candidate AP may determine, according to the target interface type, and an interface resource, load information, duration corresponding to an interface type and the like of the candidate AP, whether to set up an AP2AP interface of the target interface type with the first AP. An implementation principle thereof is similar to that of the embodiment shown in FIG. 8, and details are not described herein again.

Figure 9:
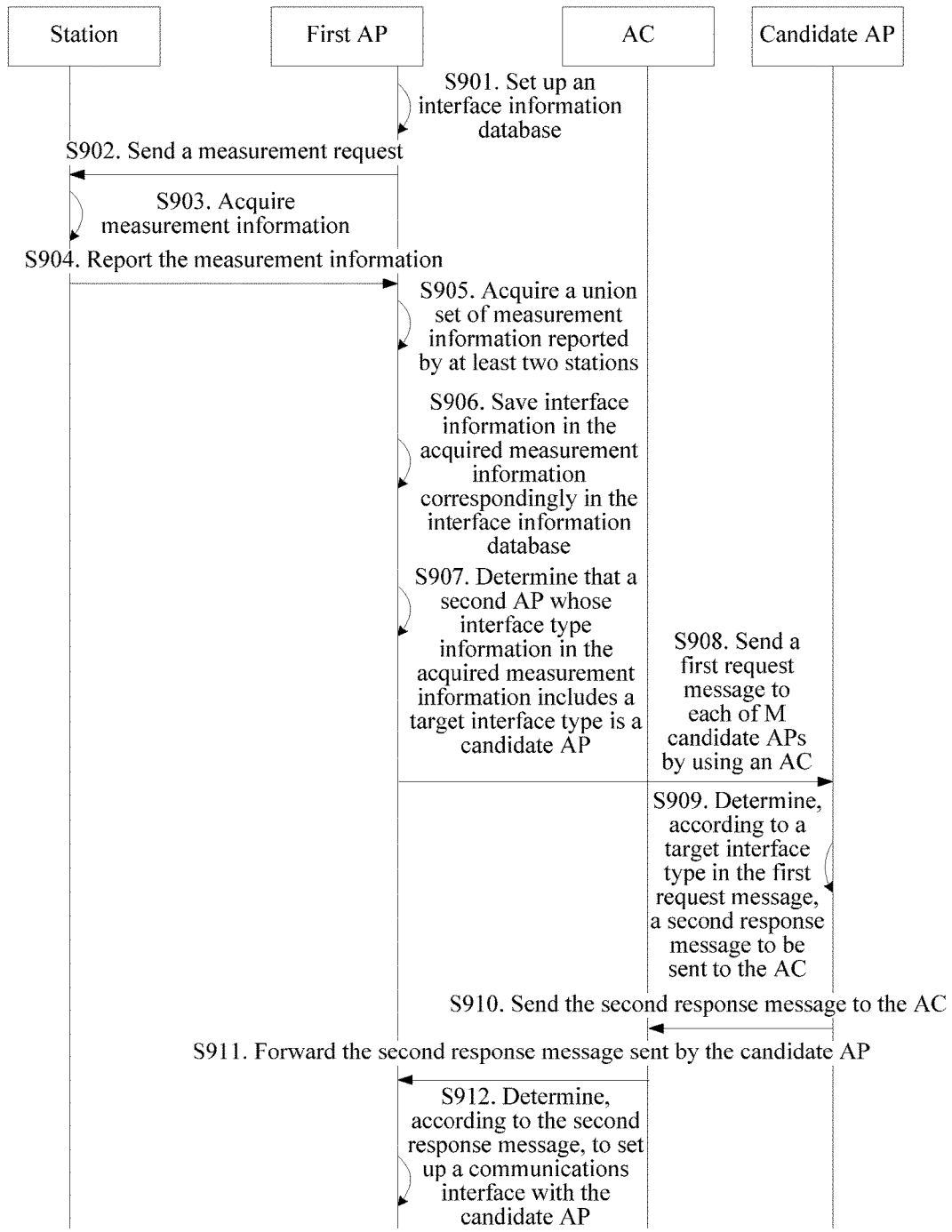
FIG. 9 is a schematic signaling flowchart of Embodiment 9 of a method for setting up a communications interface between access points according to the present invention.

FIG. 9 is a schematic signaling flowchart of Embodiment 9 of a method for setting up a communications interface between access points according to the present invention. As shown in FIG. 9, the method of this embodiment includes:

S901: A first AP sets up an interface information database.

The interface information database is used for storing measurement information reported by a station associated with the first AP.

Persons skilled in the art may understand that, the storing, by using the interface information database, the measurement information reported by the station is only a specific storage form, and another data structure may be also used for storing the measurement information reported by the station, which is not limited in the present invention.

S902: The first AP sends a measurement request to at least one station.

The at least one station refers to a station associated with the first AP, and the measurement request is used for requesting the station associated with the first AP to acquire interface information of at least one second AP.

S903: The station acquires measurement information.

After receiving the measurement request sent by the first AP, the station associated with the first AP acquires the measurement information. The measurement information includes the interface information of the at least one second AP, and interface information of each second AP includes an AP identifier and interface type information of the second AP. The second AP has a capability of supporting a communications interface between APs, that is, the second AP has a capability of supporting setup of an AP2AP interface and communication.

For a manner in which the station acquires the measurement information, refer to S401, and details are not described herein again.

Step S902 and step S903 are a manner in which the first AP triggers, by using the measurement request, the station to acquire the measurement information, and it may be understood that, the station may also actively acquire the measurement information, for example, the station acquires the measurement information once every period, and it is not required that the station acquires the measurement information only when the first AP sends the measurement request to the station.

S904: The station reports the measurement information to the first AP.

At least one station associated with the first AP reports acquired measurement information to the first AP.

It may be understood that, the station may report the measurement information after receiving a report request of the first AP.

The measurement information may be also reported once every period, and a specific implementation manner is not limited in the present invention.

Optionally, if there are at least two stations, S905 is performed, or if there is one station, S905 may be not performed.

S905: The first AP acquires a union set of measurement information reported by the at least two stations.

Different stations associated with the first AP may acquire interface data of a same second AP, and therefore, measurement information reported by each station may have duplicate interface data, and it is ensured by acquiring a union set of measurement information that, interface data of each second AP in the measurement information acquired by the stations appears only once, no phenomenon of duplicate data exists, and storage space is saved.

Certainly, union set processing may be not performed on the measurement information reported by the at least two stations.

S906: The first AP saves interface information in the acquired measurement information correspondingly in the interface information database.

Specifically, the measurement information may be measurement information on which the union set processing is performed, or may be measurement information on which the union set processing is not performed.

The saving the interface information in the interface information database is only one of implementation manners, and it may be understood that, the interface information may also be saved in another data structure.

S907: The first AP determines that a second AP whose interface type information in the acquired measurement information includes a target interface type is a candidate AP.

Specifically, it may be determined that a second AP whose interface type information in the interface information database includes the target interface type is a candidate AP.

It may also be determined that an AP identifier of a second AP whose interface type information saved in another data structure includes the target interface type is an AP identifier of a candidate AP.

S908: The first AP sends a first request message to each of M candidate APs by using an AC.

This step is similar to S203, and details are not described herein again.

S909: The candidate AP determines, according to a target interface type in the first request message, a response message to be sent to the AC.

This step is similar to S802, and details are not described herein again.

S910: The candidate AP sends the response message to the AC.

S911: The AC forwards, to the first AP, the response message sent by the candidate AP.

This step is similar to S603, and details are not described herein again.

S912: The first AP determines, according to the response message, whether to set up a communications interface with the candidate AP.

Specifically, if the response message is a setup accept message, and the setup accept message includes the IP address of the candidate AP, the first AP sets up, according to the IP address in the setup accept message, an AP2AP interface of the target interface type with the candidate AP that sends the setup accept message.

Specifically, the first AP sends an AP2AP interface setup request to the candidate AP according to the IP address of the candidate AP, and after receiving the setup request, the candidate AP sends an AP2AP interface setup response message or an AP2AP interface setup failure message to the first AP.

If the response message is a setup reject message, the first AP does not set up an AP2AP interface with the candidate AP that sends the setup reject message.

If in S912, the first AP sets up the AP2AP interface with the candidate AP, optionally, after S912, the method may further include the following step.

The first AP periodically sends an AP2AP interface update request message to the candidate AP, so that the candidate AP updates the AP2AP interface according to the update request message, and the candidate AP sends an update confirmation message to the first AP.

If the first AP intends to reset the AP2AP interface based on some reasons, for example, needing to release the AP2AP interface, the first AP sends a reset request to the candidate AP, and the candidate AP resets the AP2AP interface according to the reset request, and sends a reset response to the first AP.

It should be noted that, in the embodiment, each time after the station reports the measurement information to the first AP, the first AP may update the saved measurement information according to the newly reported measurement information.

In this embodiment, a first AP receives measurement information reported by at least one station associated with the first AP, to learn an AP identifier and interface type information of a second AP having a capability of supporting an AP2AP interface, determines that a second AP whose interface type information in the measurement information includes a target interface type is a candidate AP, and after determining an AP identifier of a candidate AP that may set up an interface of the target interface type with the first AP, sends a second request message including the identifier of the candidate AP and the target interface type to the AC, so that the AC sends, according to the AP identifier of the candidate AP, a first request message including the target interface type to the candidate AP, and the candidate AP determines, according to the target interface type, a response message to be sent to the AC, and the first AP receives the response message forwarded by the AC, and determines, according to the response message, whether to set up a communications interface with the candidate AP. Therefore, setup of a communications interface between APs in a WLAN system, that is, setup of an AP2AP interface is implemented and a large quantity of real-time information exchange between APs is implemented by using the AP2AP interface.

Figure 10:
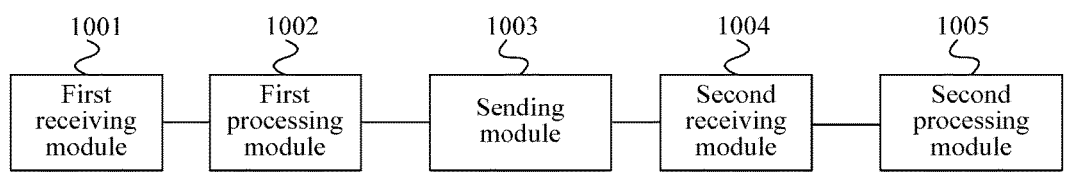
FIG. 10 is a schematic structural diagram of Embodiment 1 of an apparatus for setting up a communications interface between access points according to the present invention.

FIG. 10 is a schematic structural diagram of Embodiment 1 of an apparatus for setting up a communications interface between access points according to the present invention. As shown in FIG. 10, the apparatus of this embodiment may be deployed in a source AP, and the apparatus of this embodiment includes: a first receiving module 1001, a first processing module 1002, a sending module 1003, a second receiving module 1004 and a second processing module 1005, where the first receiving module 1001 is configured to receive measurement information reported by at least one station, where the measurement information includes interface information of at least one second AP, and the interface information of the second AP includes an AP identifier of the second AP and a capability of supporting a communications interface between APs; the first processing module 1002 is configured to determine M candidate APs according to the interface information in the measurement information, where M is an integer greater than or equal to 1; the sending module 1003 is configured to send a first request message to each of the M candidate APs by using an access controller AC, where the first request message is used for requesting the candidate AP for an Internet Protocol IP address used for setting up a communications interface between APs; the second receiving module 1004 is configured to receive, by using the AC, a response message that is determined by the candidate AP according to the first request message; and the second processing module 1005 is configured to determine, according to the response message, whether to set up a communications interface with the candidate AP that sends the response message.

The apparatus in this embodiment may be configured to perform the technical solution of the method embodiment shown in FIG. 1, implementation principles and technical effects thereof are similar, and details are not described herein again.

In this embodiment, the interface information further includes interface type information; and the first processing module 1002 is specifically configured to: if the interface type information in the measurement information includes a target interface type, determine that M second APs corresponding to the measurement information are the M candidate APs, where the target interface type is a type of an interface that the first AP requests to set up. In this embodiment, the interface information further includes interface type information and duration corresponding to an interface type in the interface type information.

The first processing module is specifically configured to: if the interface type information in the measurement information includes a target interface type, and duration corresponding to the target interface type included in the interface type information is greater than target duration, determine that M second APs corresponding to the measurement information are the M candidate APs, where the target interface type is a type of an interface that the first AP requests to set up, and the target duration is duration of the type of the interface that the first AP requests to set up. In this embodiment, the first request message includes a target interface type, where the target interface type is a type of an interface that the first AP requests to set up; and the sending module 1003 is specifically configured to receive, by using the AC, the response message that is determined by the candidate AP according to the target interface type in the first request message.

In the embodiment, the first request message includes a target interface type and target duration, the target interface type is a type of an interface that the first AP requests to set up, and the target duration is duration of the type of the interface that the first AP requests to set up; and the second receiving module 1004 is specifically configured to receive, by using the AC, the response message that is determined by the candidate AP according to the target interface type and the target duration in the first request message.

In the embodiment, the sending module 1003 is specifically configured to send, for each candidate AP, a second request message to the AC, where each second request message includes an AP identifier of one of the candidate APs and the target interface type, so that the AC sends, according to the identifier, included in the second request message, of the candidate AP, the first request message to the candidate AP corresponding to the AP identifier of the candidate AP.

In this embodiment, the sending module 1003 is specifically configured to send N second request messages to the AC, where each second request message includes AP identifiers of at least two of the candidate APs and the target interface type, so that the AC sends, according to the AP identifiers, included in the second request message, of the at least two of the candidate APs, the first request message to each of the candidate APs corresponding to the AP identifiers of the at least two of the candidate APs, where 1≤N≤M, and a total quantity of the AP identifiers, included in the N second request messages, of the candidate APs is M.

The apparatus in this embodiment may correspondingly perform the technical solution of the method embodiment shown in FIG. 2, implementation principles and technical effects thereof are similar, and details are not described herein again.

In this embodiment, the first processing module 1002 is further configured to: before the first receiving module receives the measurement information reported by the at least one station, set up an interface information database.

The first processing module 1002 is further configured to: after the first receiving module receives the measurement information reported by the at least one station, save the interface information in the measurement information correspondingly in the interface information database.

In this embodiment, the sending module 1003 is further configured to: before the first receiving module receives the measurement information reported by the at least one station, send a measurement request to the at least one station, so that the at least one station acquires the measurement information according to the measurement request.

In this embodiment, if there are at least two stations, the first receiving module 1001 is specifically configured to receive measurement information reported by the at least two stations; and acquire a union set of the measurement information reported by the at least two stations.

In this embodiment, the interface type information includes at least one of the following interface types:
coordinated transmission, interference management, resource scheduling, and service continuity.

In this embodiment, the target interface type includes at least one of the following interface types:
coordinated transmission, interference management, resource scheduling, and service continuity.

In this embodiment, the response message is a setup accept message or a setup reject message; and the setup accept message includes the IP address of the candidate AP; and the second processing module 1005 is specifically configured to: if the response message is the setup accept message, set up a communications interface with the candidate AP according to the IP address, included in the setup accept message, of the candidate AP; or if the response message is the setup reject message, skip setting up a communications interface with the candidate AP.

In this embodiment, the second processing module 1005 is specifically configured to send a setup request message of a communications interface between access points to the candidate AP according to the IP address of the candidate AP, so that the candidate AP sets up the communications interface between access points according to the setup request message of the communications interface.

In this embodiment, the sending module 1003 is further configured to: after the second processing module sets up the communications interface with the candidate AP according to the IP address, included in the setup accept message, of the candidate AP, send an update request or a reset request of a communications interface between access points to the candidate AP according to the IP address of the candidate AP, so that the candidate AP updates or resets the communications interface between access points according to the update request or the reset request.

The apparatus in this embodiment may perform the technical solution of the corresponding part of the method embodiment shown in FIG. 9, implementation principles and technical effects thereof are similar, and details are not described herein again.

Figure 11:
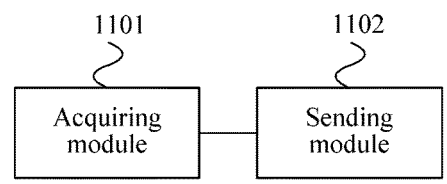
FIG. 11 is a schematic structural diagram of Embodiment 2 of an apparatus for setting up a communications interface between access points according to the present invention.

FIG. 11 is a schematic structural diagram of Embodiment 2 of an apparatus for setting up a communications interface between access points according to the present invention. The apparatus of this embodiment may be deployed in a station, and the apparatus of this embodiment includes an acquiring module 1101 and a sending module 1102, where the acquiring module 1101 is configured to acquire measurement information, where the measurement information includes interface information of at least one second AP, and the interface information includes an AP identifier of the second AP and a capability of supporting a communications interface between APs; and the sending module 1102 is configured to report the measurement information to a first AP, so that the first AP determines M candidate APs according to the interface information in the measurement information.

The apparatus in this embodiment may be configured to perform the technical solution of the method embodiment shown in FIG. 3, implementation principles and technical effects thereof are similar, and details are not described herein again.

In this embodiment, the interface information further includes interface type information; and the sending module 1102 is specifically configured to report the measurement information to the first AP, so that the first AP determines the M candidate APs according to the interface type information in the interface information in the measurement information.

In this embodiment, the interface information further includes duration corresponding to an interface type in the interface type information; and the sending module is specifically configured to report the measurement information to the first AP, so that the first AP determines the M candidate APs according to the interface type information in the measurement information and the duration corresponding to the interface type in the interface type information.

In this embodiment, the second AP includes an AP in an extended service set system and a coexistence system and a previously associated AP of a non-overlapping basic service set.

In this embodiment, the sending module 1102 is further configured to: before the acquiring module acquires the measurement information, send an interface information request message to the at least one second AP, so that the at least one second AP sends an interface information response message according to the interface information request message, and the interface information response message includes the interface information.

In this embodiment, the interface information request message is carried in a probe request frame; and the interface information response message is carried in a probe response Probe Response frame.

In this embodiment, the acquiring module 1101 is further configured to: before acquiring the measurement information, periodically receive a beacon frame sent by the at least one second AP, where the Beacon frame carries the interface information of the second AP; and the acquiring module 1101 is specifically configured to acquire the interface information of the at least one second AP from the Beacon frame sent by the at least one second AP.

The apparatus in this embodiment may correspondingly perform the technical solution of the method embodiment shown in FIG. 4, implementation principles and technical effects thereof are similar, and details are not described herein again.

Figure 12:
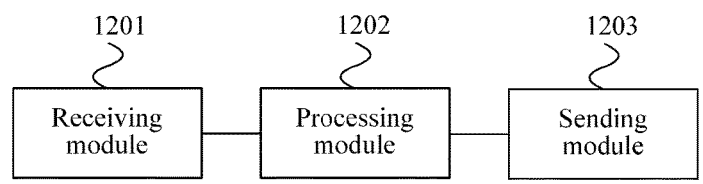
FIG. 12 is a schematic structural diagram of Embodiment 3 of an apparatus for setting up a communications interface between access points according to the present invention.

FIG. 12 is a schematic structural diagram of Embodiment 3 of an apparatus for setting up a communications interface between access points according to the present invention. The apparatus of this embodiment may be deployed in an AC, and the apparatus of this embodiment includes a receiving module 1201, a processing module 1202 and a sending module 1203, where the receiving module 1201 is configured to receive a second request message sent by a first AP, where the second request message includes an AP identifier of at least one candidate AP; the processing module 1202 is configured to send, according to the second request message, a first request message to a candidate AP corresponding to the AP identifier, included in the second request message, of the at least one candidate AP, where the first request message is used for requesting the candidate AP for an IP address used for setting up a communications interface between APs; and the sending module 1203 is configured to send a response message that is determined by the candidate AP according to the first request message to the first AP, so that the first AP determines, according to the response message, whether to set up a communications interface with the candidate AP that sends the response message.

The apparatus in this embodiment may be configured to perform the technical solution of the method embodiment shown in FIG. 5, implementation principles and technical effects thereof are similar, and details are not described herein again.

In this embodiment, the second request message further includes a target interface type;

the first request message includes the target interface type, and the first request message is used for requesting the candidate AP for an IP address used for setting up a communications interface between APs of the target interface type; and the sending module 1203 is specifically configured to send to the first AP the response message that is determined by the candidate AP according to the target interface type.

In this embodiment, if the second request message includes an AP identifier of a candidate AP and the target interface type, the processing module 1202 is specifically configured to send, according to the identifier, included in the second request message, of the candidate AP, the first request message to the candidate AP corresponding to the AP identifier of the candidate AP.

In this embodiment, if the second request message includes AP identifiers of at least two candidate APs and the target interface type, the processing module 1202 is specifically configured to generate at least two first request messages according to the second request message; and send the first request messages respectively to candidate APs corresponding to the AP identifiers of the at least two candidate APs.

The apparatus in this embodiment may be configured to perform the technical solution of the method embodiment shown in FIG. 6, implementation principles and technical effects thereof are similar, and details are not described herein again.

Figure 13:
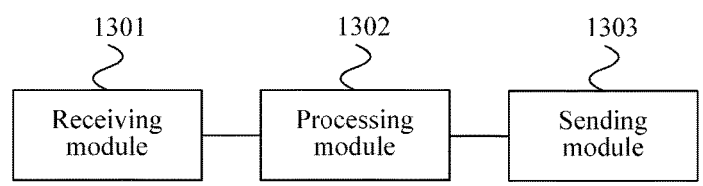
FIG. 13 is a schematic structural diagram of Embodiment 4 of an apparatus for setting up a communications interface between access points according to the present invention.

FIG. 13 is a schematic structural diagram of Embodiment 4 of an apparatus for setting up a communications interface between access points according to the present invention. The apparatus of this embodiment may be deployed in a candidate AP, and the apparatus of this embodiment includes a receiving module 1301, a processing module 1302 and a sending module 1303, where the receiving module 1301 is configured to receive a first request message sent by an access controller AC, where the first request message is used for requesting the candidate AP for an Internet Protocol IP address used for setting up a communications interface between APs; the processing module 1302 is configured to determine, according to the first request message, a response message to be sent to the AC; and the sending module 1303 is configured to send the response message to the AC, so that the AC forwards, to a first AP, the response message sent by the candidate AP, and the first AP determines, according to the response message, whether to set up a communications interface with the candidate AP that sends the response message.

The apparatus in this embodiment may be configured to perform the technical solution of the method embodiment shown in FIG. 7, implementation principles and technical effects thereof are similar, and details are not described herein again.

In the embodiment, the first request message includes a target interface type, where the target interface type is a type of an interface that the first AP requests to set up; and the processing module 1302 is specifically configured to determine, according to the target interface type, the response message to be sent to the AC.

The apparatus in this embodiment may be configured to perform the technical solution of the method embodiment shown in FIG. 8, implementation principles and technical effects thereof are similar, and details are not described herein again.

In the embodiment, the first request message further includes target duration, where the target duration is duration of the type of the interface that the first AP requests to set up; and the processing module is specifically configured to determine, according to the target interface type and the target duration, the response message to be sent to the AC.

Figure 14:
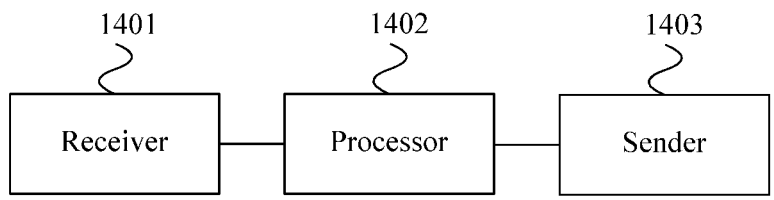
FIG. 14 is a schematic structural diagram of Embodiment 5 of an apparatus for setting up a communications interface between access points according to the present invention.

FIG. 14 is a schematic structural diagram of Embodiment 5 of an apparatus for setting up a communications interface between access points according to the present invention. As shown in FIG. 14, the apparatus of this embodiment may be deployed in a source AP, and the apparatus of this embodiment includes: a receiver 1401, a processor 1402 and a transmitter 1403, where the receiver 1401 is configured to receive measurement information reported by at least one station, where the measurement information of the second AP includes interface information of at least one second AP, and the interface information of the second AP includes an AP identifier of the second AP and a capability of supporting a communications interface between APs; and receive, by using an access controller AC, a response message that is determined by the candidate AP according to the first request message.

The processor 1402 is configured to determine M candidate APs according to the interface information in the measurement information, where M is an integer greater than or equal to 1; and determine, according to the response message, whether to set up a communications interface with the candidate AP that sends the response message; and the transmitter 1403 is configured to send a first request message to each of the M candidate APs by using the AC, where the first request message is used for requesting the candidate AP for an Internet Protocol IP address used for setting up a communications interface between APs.

The apparatus in this embodiment may be configured to perform the technical solution of the method embodiment shown in FIG. 1, implementation principles and technical effects thereof are similar, and details are not described herein again.

In this embodiment, the interface information further includes interface type information; and the processor 1402 is specifically configured to: if the interface type information in the measurement information includes a target interface type, determine that M second APs corresponding to the measurement information are the M candidate APs, where the target interface type is a type of an interface that the first AP requests to set up. In this embodiment, the interface information further includes interface type information and duration corresponding to an interface type in the interface type information; and the processor is specifically configured to: if the interface type information in the measurement information includes a target interface type, and duration corresponding to the target interface type included in the interface type information is greater than target duration, determine that M second APs corresponding to the measurement information are the M candidate APs, where the target interface type is a type of an interface that the first AP requests to set up, and the target duration is duration of the type of the interface that the first AP requests to set up.

In this embodiment, the first request message includes a target interface type, where the target interface type is a type of an interface that the first AP requests to set up.

The transmitter 1403 is specifically configured to receive, by using the AC, the response message that is determined by the candidate AP according to the target interface type in the first request message.

In this embodiment, the first request message includes a target interface type and target duration, the target interface type is a type of an interface that the first AP requests to set up, and the target duration is duration of the type of the interface that the first AP requests to set up.

The receiver 1401 is configured to receive, by using the AC, the response message that is determined by the candidate AP according to the target interface type and the target duration in the first request message.

In this embodiment, the transmitter 1403 is specifically configured to send, for each candidate AP, a second request message to the AC, where each second request message includes an AP identifier of one of the candidate APs and the target interface type, so that the AC sends, according to the identifier, included in the second request message, of the candidate AP, the first request message to the candidate AP corresponding to the AP identifier of the candidate AP.

In this embodiment, the transmitter 1403 is specifically configured to send N second request messages to the AC, where each second request message includes AP identifiers of at least two of the candidate APs and the target interface type, so that the AC sends, according to the AP identifiers, included in the second request message, of the at least two of the candidate APs, the first request message to each of the candidate APs corresponding to the AP identifiers of the at least two of the candidate APs, where $1 \leq N \leq M$, and a total quantity of the AP identifiers, included in the N second request messages, of the candidate APs is M.

In this embodiment, the processor 1402 is further configured to: before the receiver receives the measurement information reported by the at least one station, set up an interface information database.

The processor is further configured to: after the receiver receives the measurement information reported by the at least one station, save the interface information in the measurement information correspondingly in the interface information database.

The apparatus in this embodiment may correspondingly perform the technical solution of the method embodiment shown in FIG. 2, implementation principles and technical effects thereof are similar, and details are not described herein again.

In this embodiment, the transmitter 1403 is further configured to: before the receiver receives the measurement information reported by the at least one station, send a measurement request to the at least one station, so that the at least one station acquires the measurement information according to the measurement request.

In the embodiment, if there are at least two stations, the receiver 1401 is specifically configured to receive measurement information reported by the at least two stations; and acquire a union set of the measurement information reported by the at least two stations.

In the embodiment, the interface type information includes at least one of the following interface types: coordinated transmission, interference management, resource scheduling, and service continuity.

In the embodiment, the target interface type includes at least one of the following interface types: coordinated transmission, interference management, resource scheduling, and service continuity.

In the embodiment, the response message is a setup accept message or a setup reject message; and the setup accept message includes the IP address of the candidate AP.

The processor 1402 is specifically configured to: if the response message is the setup accept message, set up a communications interface with the candidate AP according to the IP address, included in the setup accept message, of the candidate AP; or if the response message is the setup reject message, skip setting up a communications interface with the candidate AP.

In the embodiment, the processor 1402 is specifically configured to send a setup request message of a communications interface between access points to the candidate AP according to the IP address of the candidate AP, so that the candidate AP sets up the communications interface between access points according to the setup request message of the communications interface.

In the embodiment, the transmitter 1403 is further configured to: after the processor sets up the communications interface with the candidate AP according to the IP address, included in the setup accept message, of the candidate AP, send an update request or a reset request of a communications interface between access points to the candidate AP according to the IP address of the candidate AP, so that the candidate AP updates or resets the communications interface between access points according to the update request or the reset request.

The apparatus in this embodiment may perform the technical solution of the corresponding part of the method embodiment shown in FIG. 9, implementation principles and technical effects thereof are similar, and details are not described herein again.

Figure 15:
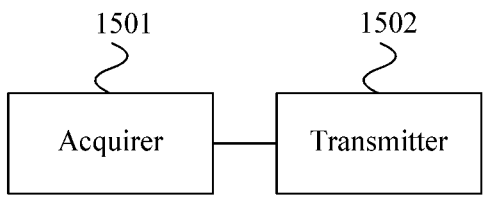
FIG. 15 is a schematic structural diagram of Embodiment 6 of an apparatus for setting up a communications interface between access points according to the present invention.

FIG. 15 is a schematic structural diagram of Embodiment 6 of an apparatus for setting up a communications interface between access points according to the present invention. The apparatus of this embodiment may be deployed in a station, and the apparatus of this embodiment includes an acquirer 1501 and a transmitter 1502, where the acquirer 1501 is configured to acquire measurement information, where the measurement information includes interface information of at least one second AP, and the interface information includes an AP identifier of the second AP and a capability of supporting a communications interface between APs; and the transmitter 1502 is configured to report the measurement information to a first AP, so that the first AP determines M candidate APs according to the interface information in the measurement information.

The apparatus in this embodiment may perform the technical solution of the corresponding part of the method embodiment shown in FIG. 3, implementation principles and technical effects thereof are similar, and details are not described herein again.

In the embodiment, the interface information further includes interface type information; and the transmitter 1502 is specifically configured to report the measurement information to the first AP, so that the first AP determines the M candidate APs according to the interface type information in the interface information in the measurement information.

The interface information further includes duration corresponding to an interface type in the interface type information.

The transmitter is specifically configured to report the measurement information to the first AP, so that the first AP determines the M candidate APs according to the interface type information in the measurement information and the duration corresponding to the interface type in the interface type information.

In the embodiment, the second AP includes an AP in an extended service set system and a coexistence system and a previously associated AP of a non-overlapping basic service set.

In the embodiment, the transmitter 1502 is further configured to: before the acquiring module acquires the measurement information, send an interface information request message to the at least one second AP, so that the at least one second AP sends an interface information response message according to the interface information request message, and the interface information response message includes the interface information.

In the embodiment, the interface information request message is carried in a probe request frame.

The interface information response message is carried in a probe response Probe Response frame.

In the embodiment, the acquirer 1501 is further configured to: before acquiring the measurement information, periodically receive a beacon frame sent by the at least one second AP, where the Beacon frame carries the interface information of the second AP.

The acquirer is specifically configured to acquire the interface information of the at least one second AP from the Beacon frame sent by the at least one second AP.

The apparatus in this embodiment may perform the technical solution of the corresponding part of the method embodiment shown in FIG. 4, implementation principles and technical effects thereof are similar, and details are not described herein again.

Figure 16:
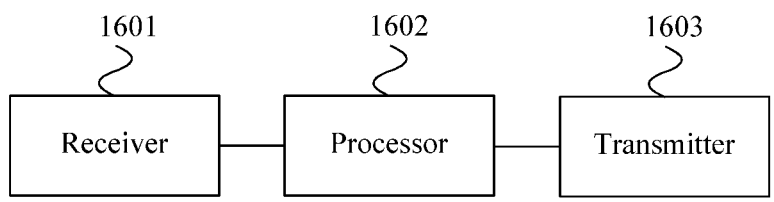
FIG. 16 is a schematic structural diagram of Embodiment 7 of an apparatus for setting up a communications interface between access points according to the present invention.

FIG. 16 is a schematic structural diagram of Embodiment 7 of an apparatus for setting up a communications interface between access points according to the present invention. The apparatus of this embodiment may be deployed in an AC, and as shown in FIG. 16, the apparatus of this embodiment includes a receiver 1601, a processor 1602 and a transmitter 1603, where the receiver 1601 is configured to receive a second request message sent by a first AP, where the second request message includes an AP identifier of at least one candidate AP.

The processor 1602 is configured to send, according to the second request message, a first request message to a candidate AP corresponding to the AP identifier, included in the second request message, of the at least one candidate AP, where the first request message is used for requesting the candidate AP for an IP address used for setting up a communications interface between APs.

The transmitter 1603 is configured to send a response message that is determined by the candidate AP according to the first request message to the first AP, so that the first AP determines, according to the response message, whether to set up a communications interface with the candidate AP that sends the response message.

The apparatus in this embodiment may perform the technical solution of the corresponding part of the method embodiment shown in FIG. 5, implementation principles and technical effects thereof are similar, and details are not described herein again.

In the embodiment, the second request message further includes a target interface type; and the first request message includes the target interface type, and the first request message is used for requesting the candidate AP for an IP address used for setting up a communications interface between APs of the target interface type.

The transmitter 1603 is specifically configured to send to the first AP the response message that is determined by the candidate AP according to the target interface type.

In the embodiment, if the second request message includes an AP identifier of a candidate AP and the target interface type, the processor 1602 is specifically configured to send, according to the identifier, included in the second request message, of the candidate AP, the first request message to the candidate AP corresponding to the AP identifier of the candidate AP.

In the embodiment, if the second request message includes AP identifiers of at least two candidate APs and the target interface type, the processor 1602 is specifically configured to generate at least two first request messages according to the second request message; and send the first request messages respectively to candidate APs corresponding to the AP identifiers of the at least two candidate APs.

The apparatus in this embodiment may perform the technical solution of the corresponding part of the method embodiment shown in FIG. 6, implementation principles and technical effects thereof are similar, and details are not described herein again.

Figure 17:
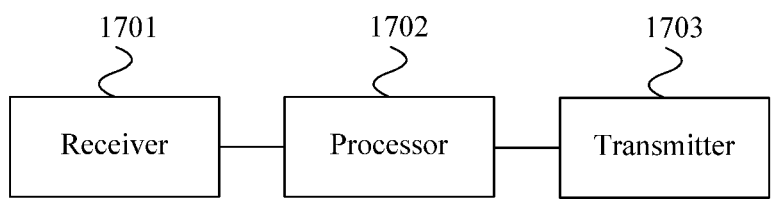
FIG. 17 is a schematic structural diagram of Embodiment 8 of an apparatus for setting up a communications interface between access points according to the present invention.

FIG. 17 is a schematic structural diagram of Embodiment 8 of an apparatus for setting up a communications interface between access points according to the present invention. The apparatus shown in FIG. 17 may be deployed in a candidate AP, and the apparatus of this embodiment includes a receiver 1701, a processor 1702 and a transmitter 1703, where the receiver 1701 is configured to receive a first request message sent by an access controller AC, where the first request message is used for requesting the candidate AP for an Internet Protocol IP address used for setting up a communications interface between APs.

The processor 1702 is configured to determine, according to the first request message, a response message to be sent to the AC; and The transmitter 1703 is configured to send the response message to the AC, so that the AC forwards, to a first AP, the response message sent by the candidate AP, and the first AP determines, according to the response message, whether to set up a communications interface with the candidate AP that sends the response message.

The apparatus in this embodiment may perform the technical solution of the corresponding part of the method embodiment shown in FIG. 7, implementation principles and technical effects thereof are similar, and details are not described herein again.

In the embodiment, the first request message includes a target interface type, where the target interface type is a type of an interface that the first AP requests to set up.

The processor 1702 is specifically configured to determine, according to the target interface type, the response message to be sent to the AC.

The apparatus in this embodiment may perform the technical solution of the corresponding part of the method embodiment shown in FIG. 8, implementation principles and technical effects thereof are similar, and details are not described herein again.

In the embodiment, the first request message further includes target duration, where the target duration is duration of the type of the interface that the first AP requests to set up.

The processor is specifically configured to determine, according to the target interface type and the target duration, the response message to be sent to the AC.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for setting up a communications interface between access points, comprising:

receiving, by a first access point (AP), measurement information reported by at least one station, wherein the measurement information comprises interface information of at least one second AP, and wherein the interface information of the at least one second AP comprises an AP identifier of the at least one second AP and a capability of supporting a communications interface between APs, wherein the interface information further comprises interface type information and a duration corresponding to an interface type in the interface type information, wherein the duration is a duration in time that the at least one second AP is capable of providing the communications interface of the interface type;

determining, by the first AP, M candidate APs according to the interface information in the measurement information, wherein M is an integer greater than or equal to 1;

sending, by the first AP, a first request message to each of the M candidate APs by using an access controller (AC), wherein the first request message requests, from the respective candidate AP, an Internet Protocol (IP) address used for setting up a communications interface between APs, wherein the communications interface is an interface for coordinating, between the APs, a type of transmission management, wherein the type of transmission management is at least one of coordinated transmission, interference management, resource scheduling, or service continuity;

receiving, by the first AP and using the AC, one or more response messages from one or more respective candidate APs of the M candidate APs, wherein each of the one or more response messages is determined by a respective candidate AP of the M candidate APs according to the first request message, and wherein the each of the one more response messages indicates whether the respective candidate AP determines to accept setting up a communications interface with the first AP;
- determining, according to the response message, whether to set up a communications interface with a first candidate AP selected from the one or more candidate APs that send a respective response message indicating that the respective candidate AP determines to accept setting up a communications interface with the first AP; and
- performing, by the first AP in response to determining to set up the communications interface with the first candidate AP, setup of the communications interface between the first AP and the first candidate AP and performing real-time information exchange directly between the first AP and the first candidate AP using the communications interface, wherein the real-time information exchange is exchange of information for coordinating management of transmissions from the first AP and the first candidate AP.

2. The method according to claim 1, wherein the determining, by the first AP, M candidate APs according to the interface information in the measurement information comprises determining, by the first AP and in response to the interface type information in the measurement information having a target interface type, that M second APs corresponding to the measurement information are the M candidate APs, wherein the target interface type is a type of an interface that the first AP requests to set up.

3. The method according to claim 2, wherein the interface type information comprises the interface type.

4. The method according to claim 1, wherein the determining, by the first AP, M candidate APs according to the interface information in the measurement information comprises:
- determining, by the first AP, in response to the interface type information in the measurement information having a target interface type, and further in response to the interface type information in the measurement information having a duration corresponding to the target interface type in the interface type information that is greater than a target duration, that M second APs corresponding to the measurement information are the M candidate APs, wherein the target interface type is a type of an interface that the first AP requests to set up, and wherein the target duration is duration of the type of the interface that the first AP requests to set up.

5. The method according to claim 1, wherein the first request message comprises a target interface type, wherein the target interface type is a type of an interface that the first AP requests to set up, and wherein each of the one or more response messages is determined by the respective candidate AP of the M candidate APs according to the target interface type in the first request message, and wherein the each of the one more response messages indicates whether the respective candidate AP determines to accept setting up a communications interface with the first AP.

6. A method for setting up a communications interface between access points, comprising:
- acquiring, by a station, measurement information, wherein the measurement information comprises interface information of at least one second access point (AP), and the interface information comprises an AP identifier of the second AP and a capability of supporting a communications interface between APs, wherein the interface information further comprises interface type information and a duration corresponding to an interface type in the interface type information, wherein the duration is a duration in time that the at least one second AP is capable of providing the communications interface of the interface type; and
- reporting, by the station, the measurement information to a first AP, so that the first AP determines M candidate APs according to the interface information in the measurement information, wherein the reporting causes the first AP to send a first request message to each of the M candidate APs by using an access controller (AC), wherein the first request message requests, from the respective candidate AP of the M candidate APs, an Internet Protocol (IP) address used for setting up a communications interface between APs, wherein the communications interface is an interface for coordinating, between the first AP and the first candidate APs, a type of transmission management, wherein the type of transmission management is at least one of coordinated transmission, interference management, resource scheduling, or service continuity, wherein the reporting further causes the first AP to determine, according to one or more response messages that are received from one or more respective candidate APs of the M candidate APs in response to the first request message, that are determined by a respective candidate AP of the M candidate APs and that indicate whether the respective candidate AP determines to accept setting up a communications interface with the first AP, and wherein the reporting further causes the first AP to, in response to determining to set up the communications interface with the first candidate AP, setup of the communications interface between the first AP and the first candidate AP selected from the one or more candidate APs and perform real-time information exchange directly between the first AP and the first candidate AP using the communications interface, wherein the real-time information exchange is exchange of information for coordinating management of transmissions from the first AP and the first candidate AP.

7. The method according to claim 6, wherein the reporting, by the station, the measurement information to the first AP comprises reporting, by the station, the measurement information to the first AP, so that the first AP determines the M candidate APs further according to the interface type information in the interface information in the measurement information.

8. The method according to claim 7, wherein the reporting, by the station, the measurement information to a first AP comprises reporting, by the station, the measurement information to the first AP, so that the first AP determines the M candidate APs further according to the interface type information in the measurement information and the duration corresponding to the interface type in the interface type information.

9. The method according to claim 6, wherein the second AP comprises an AP in an extended service set system and a coexistence system and a previously associated AP of a non-overlapping basic service set.

10. A method for setting up a communications interface between access points, comprising:
- receiving, by an access controller (AC), a second request message sent by a first access point (AP), wherein the second request message comprises an AP identifier of at least one candidate AP selected according to interface information for the at least one candidate AP further wherein the interface information comprises interface type information and a duration corresponding to an interface type in the interface type information, wherein the duration is a duration in time that the at least one candidate AP is capable of providing the communications interface of the interface type;

sending, by the AC and according to the second request message, a first request message to a first candidate AP corresponding to the AP identifier of the at least one candidate AP, wherein the first request message requests, from the first candidate AP, an Internet protocol (IP) address used for setting up a communications interface between APs, wherein the communications interface is an interface for coordinating, between the APs, a type of transmission management, wherein the communications interface is an interface for coordinating, between the APs, a type of transmission management, wherein the type of transmission management is at least one of coordinated transmission, interference management, resource scheduling, or service continuity; and sending, by the AC, a response message that is determined by the first candidate AP according to the first request message to the first AP and that indicates whether the first candidate AP determines to accept setting up a communications interface with the first AP, so that the first AP determines, according to the response message indicating the first candidate AP accepts setting up a communications interface with the first AP, whether to set up a communications interface with the first candidate AP that sends the response message, and so that the first AP sets up, in response to determining to set up the communications interface with the first candidate AP, the communications interface between the first AP and the first candidate AP and performs real-time information exchange directly between the first AP and the first candidate AP using the communications interface, wherein the real-time information exchange is exchange of information for coordinating management of transmissions from the first AP and the first candidate AP.

11. An apparatus for setting up a communications interface between access points, comprising:

a receiver configured to receive measurement information reported by at least one station, wherein the measurement information comprises interface information of at least one second access point (AP), and wherein the interface information of the at least one second AP comprises an AP identifier of a second AP and a capability of supporting a communications interface between APs, wherein the interface information further comprises interface type information and a duration corresponding to an interface type in the interface type information, wherein the duration is a duration in time that the at least one second AP is capable of providing the communications interface of the interface type;

a processor connected to the receiver;

a non-transitory computer readable medium connected to the processor and having stored thereon instructions that, when executed by the processor, cause the processor to determine M candidate APs according to the interface information in the measurement information, wherein M is an integer greater than or equal to 1; and a transmitter configured to send a first request message to each of the M candidate APs by using an access controller (AC), wherein the first request message requests, from the respective candidate AP, an Internet Protocol (IP) address used for setting up a communications interface between APs, wherein the communications interface is an interface for coordinating, between the APs, a type of transmission management, wherein the communications interface is an interface for coordinating, between the APs, a type of transmission management, wherein the type of transmission management is at least one of coordinated transmission, interference management, resource scheduling, or service continuity;

wherein the receiver is further configured to receive, by using the AC, one or more response messages from one or more respective candidate APs of the M candidate APs, wherein each of the one or more response messages is determined by a respective candidate AP of the M candidate APs according to the first request message, and wherein the each of the one more response messages indicates whether the respective candidate AP determines to accept setting up a communications interface with the first AP;

wherein the non-transitory computer readable medium further has stored thereon instructions that, when executed by the processor, cause the processor to determine, according to the response message, whether to set up a communications interface with a first candidate AP selected from the one or more candidate APs that send a respective response message indicating that the respective candidate AP determines to accept setting up a communications interface with the first AP; and wherein the non-transitory computer readable medium further has stored thereon instructions that, when executed by the processor, cause the processor to perform, in response to determining to set up the communications interface with the first candidate AP, setup of the communications interface with the first candidate AP and perform real-time information exchange directly with the first candidate AP using the communications interface, wherein the real-time information exchange is exchange of information for coordinating management of transmissions from the first AP and the first candidate AP.

12. The apparatus according to claim 11, wherein the non-transitory computer readable medium further has stored thereon instructions that, when executed by the processor, cause the processor to determine, in response to the interface type information in the measurement information having a target interface type, that M second APs corresponding to the measurement information are the M candidate APs, wherein the target interface type is a type of an interface that the first AP requests to set up.

13. The apparatus according to claim 12, wherein the interface type information comprises the interface type.

14. The apparatus according to claim 11, wherein the non-transitory computer readable medium further has stored thereon instructions that, when executed by the processor, cause the processor to determine, in response to the interface type information in the measurement information being a target interface type, and further in response to the duration corresponding to the target interface type being greater than target duration, that M second APs corresponding to the measurement information are the M candidate APs, wherein the target interface type is a type of an interface that the first AP requests to set up, and the target duration is a duration of the type of the interface that the first AP requests to set up.

15. The apparatus according to claim 11, wherein the first request message comprises a target interface type, wherein the target interface type is a type of an interface that the first AP requests to set up; and wherein each of the one or more response messages is determined by the respective candidate AP of the M candidate APs according to the target interface type in the first request message, and wherein the each of the one more response messages indicates whether the respective candidate AP determines to accept setting up a communications interface with the first AP.

16. An apparatus for setting up a communications interface between access points, comprising:

a processor;

a non-transitory computer readable medium connected to the processor and having stored thereon instructions that, when executed by the processor, cause the processor to acquire measurement information, wherein the measurement information comprises interface information of at least one second access point (AP), and wherein the interface information comprises an AP identifier of a second AP and a capability of supporting a communications interface between APs, wherein the interface information further comprises interface type information and a duration corresponding to an interface type in the interface type information, wherein the duration is a duration in time that the at least one second AP is capable of providing the communications interface of the interface type; and a transmitter connected to the processor, the transmitter configured to report the measurement information to a first AP, so that the first AP determines M candidate APs according to the interface information in the measurement information, wherein the report causes the first AP to send a first request message to each of the M candidate APs by using an access controller (AC), wherein the first request message requests, from the respective candidate AP of the M candidate APs, an Internet Protocol (IP) address used for setting up a communications interface between APs, wherein the communications interface is an interface for coordinating, between the APs, a type of transmission management, wherein the type of transmission management is at least one of coordinated transmission, interference management, resource scheduling, or service continuity, wherein the report further causes the first AP to determine, according to one or more response messages that are received from one or more respective candidate APs of the M candidate APs in response to the first request message, that are determined by a respective candidate AP of the M candidate APs and that indicate whether the respective candidate AP determines to accept setting up a communications interface with the first AP, and wherein the report further causes the first AP to, in response to determining to set up the communications interface with the first candidate AP, setup of the communications interface between the first AP and the first candidate AP selected from the one or more candidate APs and perform real-time information exchange directly between the first AP and the first candidate AP using the communications interface, wherein the real-time information exchange is exchange of information for coordinating management of transmissions from the first AP and the first candidate AP.

17. The apparatus according to claim 16, wherein the transmitter is further configured to report the measurement information to the first AP, so that the first AP determines the M candidate APs according to the interface type information in the interface information in the measurement information.

18. The apparatus according to claim 17, wherein the transmitter is further configured to report the measurement information to the first AP, so that the first AP determines the M candidate APs according to the interface type information in the measurement information and the duration corresponding to the interface type in the interface type information.

19. The apparatus according to claim 16, wherein the second AP comprises an AP in an extended service set system and a coexistence system and a previously associated AP of a non-overlapping basic service set.

20. An apparatus for setting up a communications interface between access points, comprising:

a receiver, configured to receive a second request message sent by a first access point (AP), wherein the second request message comprises an AP identifier of at least one candidate AP selected according to interface information for the at least one candidate AP further wherein the interface information comprises interface type information and a duration corresponding to an interface type in the interface type information, wherein the duration is a duration in time that the at least one candidate AP is capable of providing the communications interface of the interface type; and a transmitter, configured to send, according to the second request message, a first request message to a first candidate AP corresponding to the AP, wherein the first request message requests, from the first candidate AP, an Internet protocol (IP) address used for setting up a communications interface between APs, wherein the communications interface is an interface for coordinating, between the APs, a type of transmission management, wherein the type of transmission management is at least one of coordinated transmission, interference management, resource scheduling, or service continuity, and wherein the transmitter is further configured to send a response message that is determined by the first candidate AP according to the first request message to the first AP and that indicates whether the first candidate AP determines to accept setting up a communications interface with the first AP, so that the first AP determines, according to the response message indicating the first candidate AP accepts setting up a communications interface with the first AP, whether to set up a communications interface with the first candidate AP that sends the response message, and so that the first AP sets up, in response to determining to set up the communications interface with the first candidate AP, the communications interface between the first AP and the first candidate AP and performs real-time information exchange directly between the first AP and the first candidate AP using the communications interface, wherein the real-time information exchange is exchange of information for coordinating management of transmissions from the first AP and the first candidate AP.

* * * * *